United States Patent
Kim et al.

(10) Patent No.: US 12,475,080 B2
(45) Date of Patent: Nov. 18, 2025

(54) DATA ARCHIVING METHOD AND SYSTEM FOR MINIMIZING COST OF DATA TRANSMISSION AND RETRIEVAL

(71) Applicant: ARMIQ Co., Ltd., Seoul (KR)

(72) Inventors: Oxoo Kim, Seoul (KR); Sehun Jung, Seoul (KR)

(73) Assignee: ARMIQ Co., Ltd., Seoul (KR)

( * ) Notice: Subject to any disclaimer, the term of this patent is extended or adjusted under 35 U.S.C. 154(b) by 585 days.

(21) Appl. No.: 17/842,684

(22) Filed: Jun. 16, 2022

(65) Prior Publication Data

US 2022/0327095 A1    Oct. 13, 2022

Related U.S. Application Data

(63) Continuation of application No. PCT/KR2020/018911, filed on Dec. 22, 2020.

(30) Foreign Application Priority Data

Jan. 6, 2020   (KR) .................. 10-2020-0001413
Dec. 21, 2020  (KR) .................. 10-2020-0179839

(51) Int. Cl.
   *G06F 16/11*    (2019.01)
   *G06F 16/16*    (2019.01)

(52) U.S. Cl.
   CPC ............ *G06F 16/113* (2019.01); *G06F 16/16* (2019.01)

(58) Field of Classification Search
   CPC ......... G06F 16/113; G06F 16/16; G06F 16/27
   See application file for complete search history.

(56) References Cited

U.S. PATENT DOCUMENTS

| | | | |
|---|---|---|---|
| 9,304,707 B1* | 4/2016 | Helsley | G06F 3/0619 |
| 2002/0129216 A1 | 9/2002 | Collins | |
| 2014/0006354 A1* | 1/2014 | Parkison | G06F 16/172 |
| | | | 707/661 |
| 2014/0040573 A1* | 2/2014 | Cherkasova | G06F 11/1446 |
| | | | 711/E12.103 |
| 2014/0081919 A1* | 3/2014 | Matsumoto | G06F 11/1469 |
| | | | 707/E17.007 |

(Continued)

FOREIGN PATENT DOCUMENTS

| | | |
|---|---|---|
| KR | 10-2012-0140668 A | 12/2012 |
| KR | 10-2015-0075190 A | 7/2015 |
| KR | 10-2016-0117528 A | 10/2016 |

OTHER PUBLICATIONS

"A Guideline for Hardware Sizing of Information Systems," TTA Standard, Telecommunications Technology Association, Revised Dec. 19, 2018 (English Abstract).

(Continued)

*Primary Examiner* — Taelor Kim
(74) *Attorney, Agent, or Firm* — CHRISTENSEN O'CONNOR JOHNSON KINDNESS PLLC

(57) ABSTRACT

Provided are a data archiving method and system capable of reducing the cost of transmitting and retrieving archived data by determining a transmission capacity or a retrieval capacity according to at least one of a characteristic of a storage system and a charging system in a process of transmitting at least some of data stored in a target system for archiving to the storage system or in a process of retrieving data archived in the storage system.

2 Claims, 26 Drawing Sheets

(56) References Cited

U.S. PATENT DOCUMENTS

| | | | | |
|---|---|---|---|---|
| 2015/0100553 A1* | 4/2015 | Fabijancic | ............ | G06F 16/258 |
| | | | | 707/673 |
| 2015/0312124 A1* | 10/2015 | Curtin | ................... | G06F 16/122 |
| | | | | 709/224 |
| 2016/0253404 A1* | 9/2016 | Fabijancic | .............. | G06F 16/21 |
| | | | | 707/625 |
| 2019/0196879 A1* | 6/2019 | Dutta | ....................... | G06F 9/505 |
| 2019/0347551 A1 | 11/2019 | Lobacheva et al. | | |

OTHER PUBLICATIONS

Office Action mailed Jun. 28, 2021, issued in corresponding Korean Patent Application No. 10-2020-0179839, filed Dec. 21, 2020, 8 pages.

Notice of Allowance mailed Sep. 2, 2021, issued in corresponding Korean Patent Application No. 10-2020-0179839, filed Dec. 21, 2020, 10 pages.

Korean Office Action mailed on Sep. 24, 2022, issued in Korean Application No. 10-2020-0008276 (Korean version) 4 pages.

\* cited by examiner

FIG. 8

| PERIOD | OBJECT ID |
|--------|-----------|
| 2002.01 | O0001 |
| 2002.02 | O0002 |
| 2002.03 | O0003 |

810 PERIOD
820 OBJECT ID
800

FIG. 9

| Col1 | OBJECT ID |
|------|-----------|
| 1000 | O0001 |
| 2000 | O0002 |

FIG. 19

| Processing scheme | Detailed technology | Description | Example (before ► after) | |
|---|---|---|---|---|
| Pseudony-mization | Heuristic seudonymization | Method of substituting values corresponding to identifier with some predetermined rules (N:1) | Beom-soo Lee | Gil-dong Hong |
| | Encryption | Method of substituting personal information by encrypting it by applying algorithm having given rule | 880204-1234567 | A594FB3B130 |
| | Swapping | Method of substituting record of existing DB by associating it with predetermined item value (1:1) | Man, woman | A, B |
| Aggregation | Aggregation | Method of substituting all or some of data by aggregating it (total, average, etc.) | 45 years old (actual age) | 37 years old (total average age) |
| | Micro Aggregation | Method of aggregating only records of specific portion within data set | 2 million Korean won (only the forties having a great income difference) | 3.5 million Korean won (average income in their forties) |
| | Rounding | Method of finally aggregating data applying rounding (round up, round down, round off) | 73kg | 70kg (roundoff) |
| | Rearrangement | Method of avoiding damage to entire information by mixing personal information with information of others | A type (Beom-soo Lee) | O type (Sang-jin Kim) |
| Data Reduction | Delete identifier | Method of simply deleting identifier from original data | 1988.02.04 | 1988 (month, date information deleted) |
| | Partially delete identifier | Method of deleting some of corresponding identifier | 78, Garakbon-dong, Songpa-gu, Seoul | Songpa-gu, Seoul |
| | Reducing Records | Method of deleting all records clearly different from other information | 213cm | deleted |
| | Fully delete identification element | Method of fully deleting potential identification element in addition to identifier | Beom-soo Lee, case No. 101, Father (Man-seok Lee) | Delete all including name |
| Data Suppression | Hiding | Method of converting into average or suppression value of data | Hepatitis group specific person "A" | Specific person "A" |
| | Random Rounding | Method of rounding up or down records based on given number | 45 years old | Forties |
| | Data Range | Method of representing data as range or interval based on given number | 3,300 Korean won | 3,000~4,000 Korean won |
| | Controlled Rounding | Method of matching sums of unmatched rows and columns through control in "random rounding" method | Not used | |
| Data Masking | Adding Random Noise | Method of adding (adding or multiplying) noise, such as given number | 1988-02-04 | 1988-08-04 (6 months added) |
| | Blank and Impute | Method of changing some or all of specific items into blank or substitution letter ("*", "_") | 010-555-2580 | 010-*-** |

DATA ARCHIVING METHOD AND SYSTEM FOR MINIMIZING COST OF DATA TRANSMISSION AND RETRIEVAL

CROSS-REFERENCES TO RELATED APPLICATIONS

This is a continuation of International Application No. PCT/KR2020/018911, filed Dec. 22, 2020, which claims the benefit of Korean Patent Application No. 10-2020-0001413, filed Jan. 6, 2020, and Korean Patent Application No. 10-2020-0179839, filed Dec. 21, 2020, the disclosures of which are incorporated herein by reference in their entirety.

BACKGROUND OF INVENTION

Field of Invention

The following description relates to a method and system for archiving data for minimizing costs for data transmission and inquiry.

Description of Related Art

Recently, as data-related regulations are strengthened, the medical industry grows, and the importance of data storage and management of patients and the management of data within a company are increased, the necessity of research of data archiving is increased. For example, from a viewpoint of data-related regulations, laws were regulated to store data, such as financial transactions data and medical information, for several years to several tens of years for consumer right protection. Data needs to be stored for a long period due to various data-related regulations. Furthermore, the amount of medical image data is increased as dependency on image diagnosis is increased in the medical industry field. Accordingly, the necessity of an archiving system for the management of increased data including storage and backup demands for the retention and management of data is increased. Furthermore, from a viewpoint of the management of data within a company, a function for securing and managing data important in terms of security, in addition to a task for storing, in a server, a large amount of data transmitted and received by and from a company and restoring data stored in a server in real time and a backup task, becomes important. Meanwhile, from a viewpoint of automation in manufacturing business, labor-intensive manufacturers traditionally transferred their factories to low-wage countries, such as China and India. However, with the development of the robot technology, converged robot factories having efficiency of production and improved quality are constructed, thereby accelerating factory automation.

As the fourth industrial revolution arrives, the big data field has been in the spotlight. In the big data field in Korea, infrastructure investment, such as a server, storage, and a network, is currently focused. In the future, however, it is necessary to expand an opportunity of development to software and service fields by distributing investment in infrastructure through the development of an archiving technology. Accordingly, there is a growing need for the development of an archiving technology having a high data compression rate and compression speed and fast data inquiry compared the existing technology.

BRIEF SUMMARY OF THE INVENTION

There are provided a data archiving method and system, which can reduce costs for the transmission or inquiry of archived data by determining a transmission capacity or an inquiry capacity based on at least one of a characteristic and billing system of a storage system in a process of transmitting, to the storage system, at least some of data stored in a target system in order to archive the at least some data in the storage system or a process of inquiring about data archived in the storage system.

There is provided a data archiving method performed by a computer device including at least one processor, including determining, by the at least one processor, a transmission capacity or an inquiry capacity based on at least one of a characteristic and billing system of an external system including a storage system in a process of transmitting, to the storage system, at least some of data stored in a target system in order to archive the at least some data in the storage system or a process of inquiring about data archived in the storage system.

According to an aspect, the data archiving method may further include grouping, by the at least one processor, archiving target data as an object which is a minimum process processing unit based on dependency between tables within a database of the target system, dividing and defining, by the at least one processor, a transmission scenario of archiving data for each small classification depending on a business type, allocating, by the at least one processor, the object for each small classification of the transmission scenario, and processing, by the at least one processor, transmission simulations for each small classification.

According to another aspect, the data archiving method may further include, by the at least one processor, reallocating the object for each small classification of the transmission scenario based on the determined transmission capacity.

According to still another aspect, the external system may include a cloud system. Determining the transmission capacity or the inquiry capacity may include determining the transmission capacity or the inquiry capacity based on a maximum processing availability of a platform as a service (PaaS) function provided by the cloud system as the characteristic of the external system including the storage system.

According to still another aspect, determining the transmission capacity or the inquiry capacity may include determining the number of times of transmission, the number of times of reception, a one-time transmission capacity or a one-time reception capacity based on the billing system of the external system including the storage system so that a billing cost is minimized.

According to still another aspect, the external system may include cloud systems of two or more different cloud service providers. The data archiving method may further include monitoring, by the at least one processor, a present data usage situation and cost of each of the cloud systems, processing, by the at least one processor, service simulations using the cloud systems, managing, by the at least one processor, data transmission between the cloud systems, and processing, by the at least one processor, data cleansing in a first cloud system after data transmission from the first cloud system of the cloud systems to a second cloud system.

A data archiving method performed by a computer device including at least one processor includes monitoring, by the at least one processor, a present data usage situation and cost of each of cloud systems of two or more different cloud service providers, processing, by the at least one processor, service simulations using the cloud systems, managing, by the at least one processor, data transmission between the cloud systems, and processing, by the at least one processor, data cleansing in a first cloud system after data transmission from the first cloud system of the cloud systems to a second cloud system.

There is provided a computer program stored in a computer-readable recording medium in order to execute the method in a computer device in association with the computer device.

There is provided a computer-readable recording medium on which a program for executing the method in a computer device has been recorded.

A computer device includes at least one processor implemented to execute a computer-readable instruction. The at least one processor determines a transmission capacity or an inquiry capacity based on at least one of a characteristic and billing system of an external system including a storage system in a process of transmitting, to the storage system, at least some of data stored in a target system in order to archive the at least some data in the storage system or a process of inquiring about data archived in the storage system.

Costs for the transmission or inquiry of archived data can be reduced by determining a transmission capacity or an inquiry capacity based on at least one of a characteristic and billing system of a storage system in a process of transmitting, to a storage system, at least some of data stored in a target system in order to archive the at least some data in the storage system or a process of inquiring about data archived in the storage system.

BRIEF DESCRIPTION OF THE DRAWINGS

FIG. 8 is a diagram illustrating an example of a structure of a period index table according to an embodiment of the present disclosure.

FIG. 9 is a diagram illustrating an example of a structure of a group index table according to an embodiment of the present disclosure.

FIG. 19 is a diagram illustrating an example of a process for de-identifying data in an embodiment of the present disclosure.

DETAILED DESCRIPTION OF THE INVENTION

Figure 1:
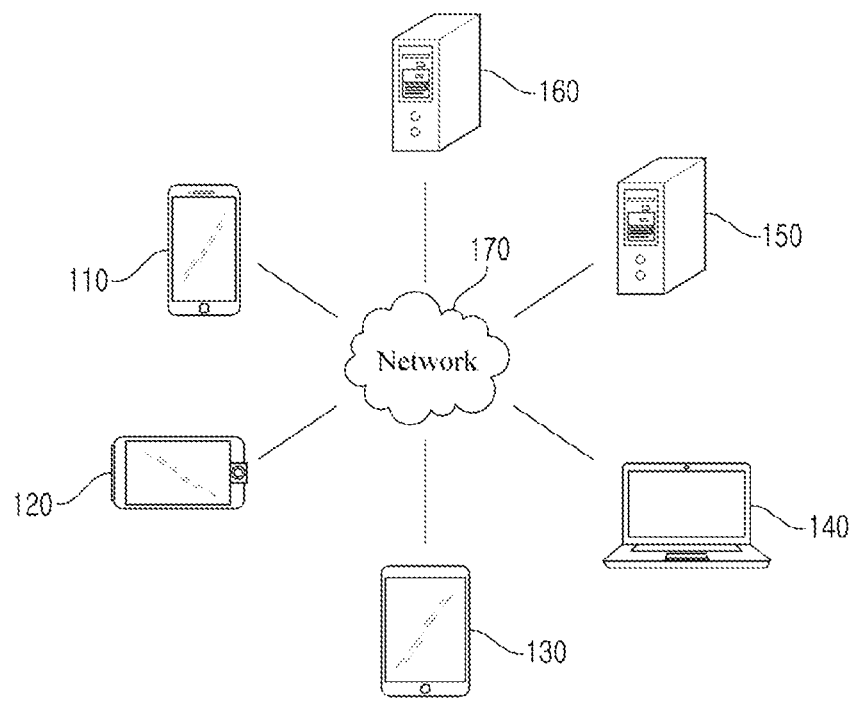
FIG. 1 is a diagram illustrating an example of a network environment according to an embodiment of the present disclosure.

The present disclosure may be modified in various ways and may have various embodiments, and specific embodiments will be described in the drawings and described in detail. It is however to be understood that the present disclosure is not intended to be limited to the specific disclosure and that the present disclosure includes all changes, equivalents and substitutions which fall within the spirit and technical scope of the present disclosure. Similar reference numerals are used for similar components while each drawing is described.

Terms, such as a first, a second, A and B, may be used to describe various components, but the components should not be restricted by the terms. The terms are used to only distinguish one component from another component. For example, a first component may be referred to as a second component without departing from the scope of a right of the present disclosure. Likewise, a second component may be referred to as a first component. The term "and/or" includes a combination of a plurality of related and described items or any one of a plurality of related and described items.

When it is described that one component is "connected" or "coupled" to another component, the one component may be directly connected or coupled to the another component, but it should be understood that a third component may exist between the two components. In contrast, when it is described that one component is "directly connected" or "directly coupled" to another component, it should be understood that another component does not exist between the two components.

Terms used in this application are used to merely describe a specific embodiment and are not intended to restrict the present disclosure. An expression of the singular number includes an expression of the plural number unless clearly defined otherwise in the context. In this application, it is to be understood that a term, such as "include" or "have", is intended to designate that a characteristic, a number, a step, an operation, a component, a part or a combination of them described in the specification is present, and does not exclude the presence or addition possibility of one or more other characteristics, numbers, steps, operations, components, parts, or combinations of them in advance.

All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Hereinafter, embodiments are described in detail with reference to the accompanying drawings.

A data archiving system according to embodiments of the present disclosure may be implemented by at least one computer device. A data archiving method according to embodiments of the present disclosure may be performed through at least one computer device included in a data archiving system. A computer program according to an embodiment of the present disclosure may be installed and driven in the computer device. The computer device may perform the data archiving method according to embodiments of the present disclosure under the control of a driven computer program. The aforementioned computer program may be stored in a computer-readable recording medium in order to execute the data archiving method in the computer device in association with the computer device.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment of FIG. 1 merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides the plurality of electronic devices 110, 120, 130, and 140 connected through the network 170 with services (e.g., an archiving service, a file distribution service, a content provision service, a group communication service (or a voice conference service), a messaging service, a mail service, a social network service, a map service, a translation service, a finance service, a payment service, and a search service).

Figure 2:
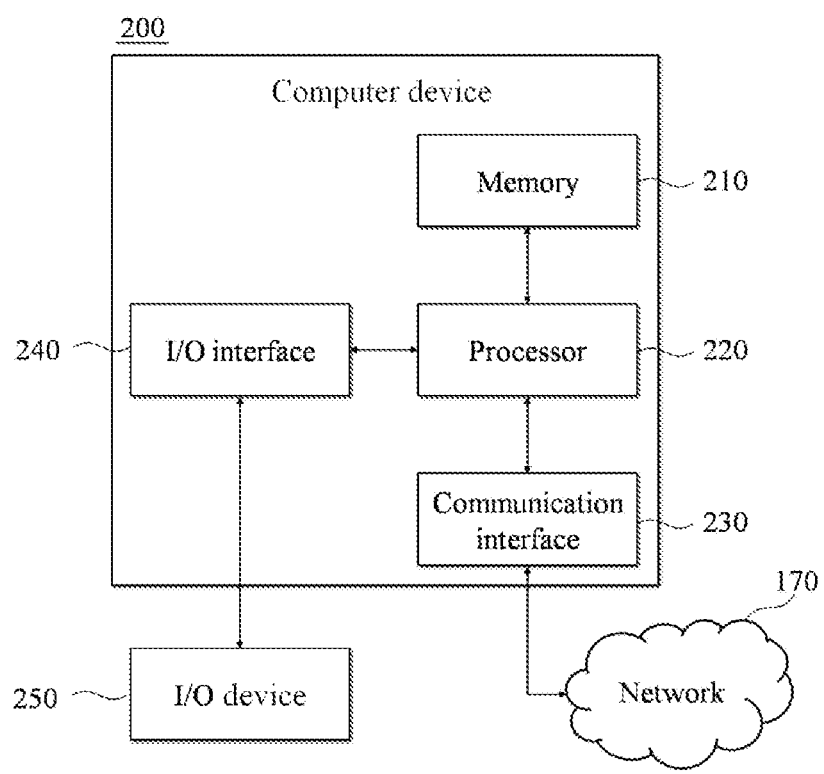
FIG. 2 is a block diagram illustrating an example of a computer device according to an embodiment of the present disclosure.

FIG. 2 is a block diagram illustrating an example of a computing device according to an embodiment of the present disclosure. Each of the plurality of electronic devices 110, 120, 130 and 140 or each of the servers 150 and 160 may be implemented as a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded onto the memory 210 from a computer-readable recording medium separated from the memory 210. Such a separate computer-readable recording medium may include computer-readable recording media, such as a floppy drive, a disk, a tape, a DVD/CD-ROM drive, and a memory card. In another embodiment, software components may be loaded onto the memory 210 through the communication interface 230 not a computer-readable recording medium. For example, the software components may be loaded onto the memory 210 of the computer device 200 based on a computer program installed by files received over the network 170.

The processor 220 may be configured to process instructions of a computer program by performing basic arithmetic, logic and input/output (I/O) operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, a command, data or a file generated by the processor 220 of the computer device 200 based on a program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (e.g., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. Furthermore, for example, the I/O interface 240 may be means for an interface with a device in which functions for input and output have been integrated into one, such as a touch screen. At least one of the I/O devices 250, together with the computer device 200, may be configured as a single device.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

Figure 3:
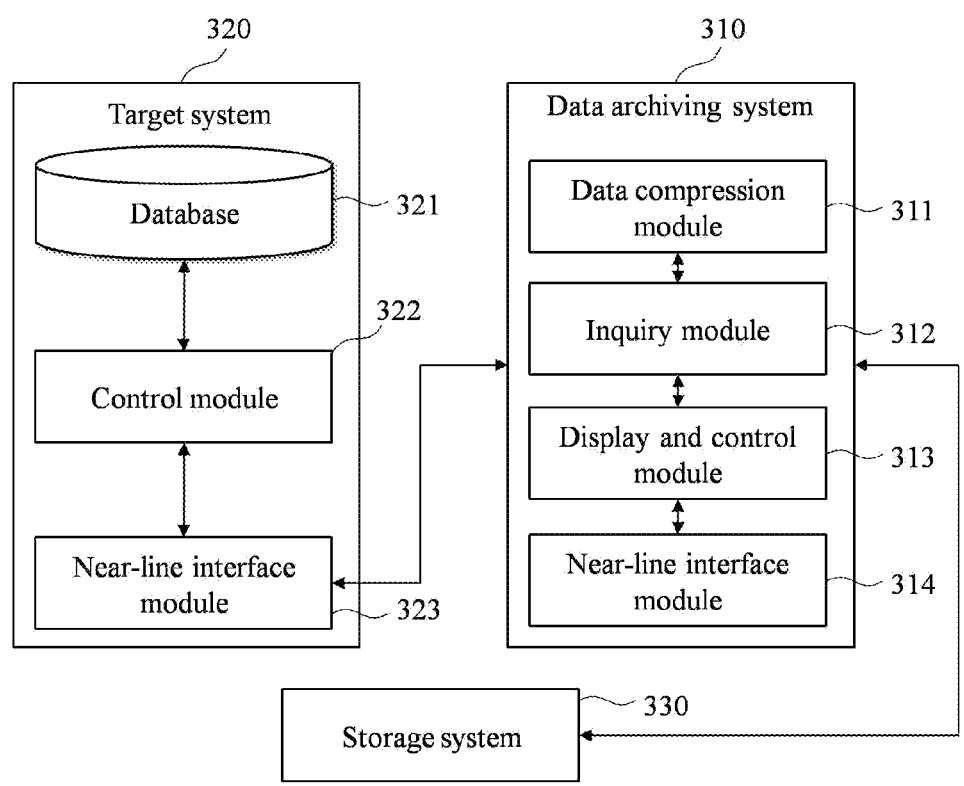
FIG. 3 is a diagram illustrating a schematic shape of a computer system for archiving in an embodiment of the present disclosure.

FIG. 3 is a diagram illustrating a schematic shape of a computer system for archiving in an embodiment of the present disclosure.

A data archiving system 310 may be implemented by a physical device, such as the computer device 200 described with reference to FIG. 2, or a combination of a plurality of the physical devices, and may include a data compression module 311, an inquiry module 312, a display and control module 313 and a near-line interface module 314 as illustrated in FIG. 3. In this case, each of the data compression module 311, the inquiry module 312, the display and control module 313 and the near-line interface module 314 may be a functional expression of an operation performed by the processor 220 of the computer device 200 that implements the data archiving system 310 based on a code of an archiving solution program installed in the data archiving system 310. For example, the archiving solution program may include a code for providing a data compression function. The processor 220 may provide the data compression function through such a code. In this case, the "data compression module 311" may be used as a functional expression of an operation(s) for providing the data compression function of the processor 220.

In other words, the data archiving system 310 may be implemented as the archiving solution program is installed and driven in the computer device 200. For example, the archiving solution program may be developed as a cloud software as a service (SaaS) type product and registered with cloud systems of various cloud vendors, and may provide functions for archiving to a target system 320 to be described later. Furthermore, for example, the data archiving system 310 may be implemented in the form of an appliance server in which a remote near-line data archiving technology (archiving solution program) and hardware have been integrated. The appliance server can maintain consistent product quality and provide competitiveness because delivery and maintenance are easy due to its product form.

The target system 320 may be implemented by a physical device, such as the computer device 200 described with reference to FIG. 2, a combination of a plurality of the physical devices, and may include a database 321, a control module 322 and a near-line interface module 323 as illustrated in FIG. 3. In this case, the control module 322 and the near-line interface module 323 may also be functional expressions of operations performed by the processor 220 of the computer device 200 that implements the target system 320.

The data archiving system 310 and the target system 320 may communicate with each other over a network (e.g., the network 170 described with reference to FIGS. 1 and 2). The target system 320 may call a function provided by the data archiving system 310 through the near-line interface module 323 under the control of the control module 322. In this case, the data archiving system 310 may provide the target system 320 with the function called by the target system 320. For example, the target system 320 may be an integrated information system for enterprise resource planning (ERP). The near-line interface module 323 may be based on a remote function call (RFC) for SAP ERP, for example.

Figure 4:
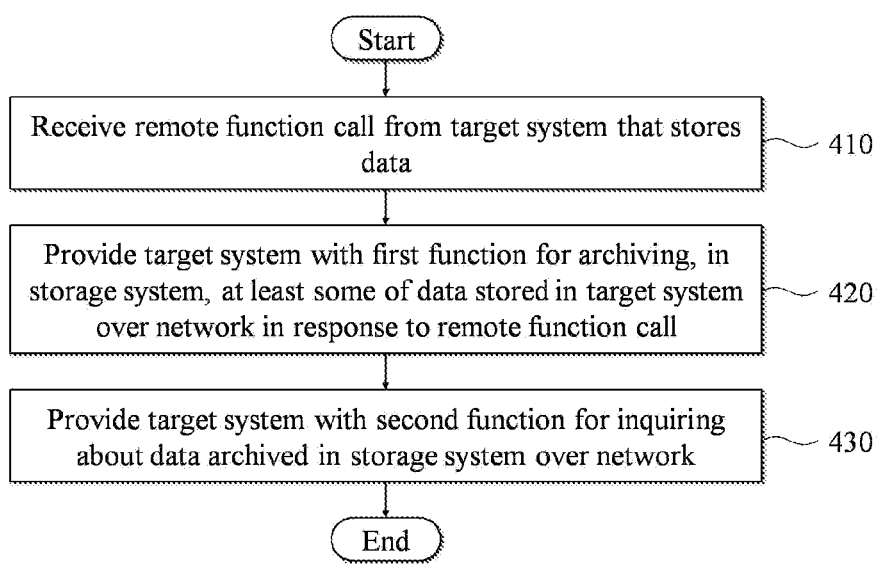
FIG. 4 is a flowchart illustrating an example of a data archiving method according to an embodiment of the present disclosure.

FIG. 4 is a flowchart illustrating an example of a data archiving method according to an embodiment of the present disclosure. The data archiving method according to the present embodiment may be performed by the computer device 200 that implements the aforementioned data archiving system 310. In this case, the processor 220 of the computer device 200 may be implemented to execute a control instruction based on a code of an operating system or a code of at least one computer program included in the memory 210. In this case, the processor 220 may control the computer device 200 so that the computer device 200 performs steps 410 to 430 included in the method of FIG. 4 in response to a control instruction provided by a code stored in the computer device 200. Furthermore, the computer program may correspond to the aforementioned archiving solution program.

In step 410, the computer device 200 may receive a remote function call from a target system that stores data. In this case, the target system may correspond to the target system 320 described with reference to FIG. 3. The remote function call may be generated through the near-line interface module 323 of the target system 320.

In step 420, the computer device 200 may provide the target system with a first function for archiving, in a storage system, at least some of the data stored in the target system over a network in response to the remote function call.

For example, Referring back to FIG. 3, the data archiving system 310 may provide the target system 320 with the first function for archiving, in a storage system 330, at least some of the data stored in the database 321 of the target system 320 over a network in response to the call of the target system 320.

In this case, in an embodiment, the storage system 330 may be a local database (e.g., the database 321) included in the target system 320, an external database of the target system 320 and/or a repository included in an external system (e.g., a file server or a cloud server) of the target system 320.

For example, the data archiving system 310 may provide, as the first function, a function for compressing at least some of data stored in the database 321 of the target system 320 and archiving the compressed data in a table of the database 321. In this case, an archiving speed is fast and a data inquiry speed can also be improved because the compressed data is not stored in the form of a file, but is stored in a table of the database 321 of the target system 320.

Furthermore, for example, the data archiving system 310 may provide, as the first function, a function for compressing at least some of data stored in the database 321 of the target system 320 and archiving the compressed data in a table of an external database of the target system 320. For example, from a viewpoint of the data archiving system 310, assuming that the target system 320 is a cloud, the data archiving system 310 may store compressed data in a table of a database included in another cloud.

Furthermore, for example, the data archiving system 310 may provide, as the first function, a function for compressing at least some of data stored in the database 321 of the target system 320 as a file and archiving the file in a repository included in an external system of the target system 320. For example, if the data archiving system 310 has been implemented within a cloud system, the data archiving system 310 may store, in a repository of the cloud system, a file including compressed data.

As a more detailed example, the data archiving system 310 may provide the target system 320 with a user interface for providing functions, such as the management of a retention period for an archiving service, an archiving configuration, archiving execution, monitoring, data inquiry and data management, through the display and control module 313.

In this case, when the execution of archiving is requested through the user interface provided through the display and control module 313, the data archiving system 310 may provide the target system 320 with the first function for archiving, in the storage system 330, at least some of the data stored in the database 321 of the target system 320 based on an archiving configuration configured through the data compression module 311. In other words, the target system 320 may archive, in the storage system 330, at least some of the data stored in its database 321 by using the first function provided by the data archiving system 310.

In step 430, the computer device 200 may provide the target system with a second function for inquiring about data archived in the storage system over a network. Such a second function may also be provided by a remote function call from the target system.

For example, referring back to FIG. 3, the data archiving system 310 may provide the target system 320 with the second function for inquiring about data archived in the storage system 330 over a network in response to a call from the target system 320.

When a data inquiry is requested through the user interface provided through the display and control module 313, the data archiving system 310 may provide the target system 320 with the second function for inquiring about data archived in the storage system 330 through the inquiry module 312. In other words, the target system 320 may inquire about the data archived in the storage system 330 by using the second function provided by the data archiving system 310.

As described above, the target system 320 can archive data stored in the database 321 by using the functions provided by the data archiving system 310 without the need to add separate hardware.

As described above, the first function provided by the data archiving system 310 may include a function for storing compressed data in a table of a database (the database 321 of the target system 320 or the external database) and keeping the stored data or keeping the stored data in the form of a file. In this case, since the archived data compressed and kept in a table of the database causes an increase in the volume of the database as data, the data archiving system 310 may manage a data lifespan cycle. For example, the data archiving system 310 may manage a data lifespan cycle according to a procedure of "database→data compression archiving→file archiving→archiving product." In this case, the "database" may mean that data is managed in the state in which the data has been stored in the database 321 of the target system 320. Furthermore, the "data compression archiving" may mean that data is compressed and managed in the state in which the data has been compressed in a table of a database (the database 321 of the target system 320 or an external database). Furthermore, the "file archiving" may mean that when a retention period of compressed data elapses, data managed in the state in which the data has been compressed in a table of the database is archived and kept as a file. The "archiving product" may mean that data no longer needed to be kept as a file among archived data is deleted.

The "file archiving" may be performed in a repository of the target system 320, but may be performed in a repository of the external system of the target system 320. As a more detailed example, the data archiving system 310 may access the target system 320 that has completed the extraction of a compression target, in order to transmit archived data to the cloud system included in a separate system outside the target system 320. In this case, the data archiving system 310 may call the target system through the near-line interface module 314. Such a call may be based on an API call. Since compressed data may be stored in various types of storage, the call may be implemented to be connectable to various types of storage, such as a database, a disk, a file, an in-memory, a quantum memory, NoSQL, a graph-DB, and a blockchain database. Meanwhile, the data archiving system 310 may define a transmission scenario based on a business type, such as finance, costs, production, sales, materials, quality, or a system. In an embodiment, the data archiving system 310 may generate a small group of a transmission scenario by considering a network bandwidth. Furthermore, the data archiving system 310 may allocate an object to the transmission scenario. If small groups of a transmission scenario are present, the data archiving system 310 may allocate, to a small group of the transmission scenario, an object whose extraction has been completed. Furthermore, the data archiving system 310 may convert an extraction object into a binary object, and may construct a present transmission history table for an object capacity and quantity for each transmission scenario and/or for each small group. Furthermore, the data archiving system 310 may perform transmission simulations. In this case, the data archiving system 310 can predict an optimal time for each object data ratio in subsequent transmission by selecting a simulation target for each transmission scenario and/or for each small group and checking a transmission time for each object by executing the transmission simulations. After the transmission simulations, the data archiving system 310 may execute actual data transmission by using scenario information, small group information and/or object information. In this case, the data archiving system 310 may optimize a total end time by arranging small groups and/or objects having small transmission times on the basis of a small group and/or object having the longest transmission time based on the transmission simulation information. In this case, the data archiving system 310 may separately store data storage locations for each data character, and may check the number of transmissions and an execution time in real time through a transmission situation monitoring tool. Furthermore, the data archiving system 310 may update a transmission execution map with an extraction progress situation, and can maintain the speed and integrity by proceeding from an order after completion when an error occurs. The transmission of data may be selectively performed through a streaming method or object unit transmission. Furthermore, the data archiving system 310 may confirm whether the transmission of data for each scenario and/or each small group, transmitted by the target system 320, to the storage system 330 has been completed, and may verify a process of transmitting archived data by comparing the transmitted data with an object capacity and a present quantity situation table for each transmission scenario and/or each small group. In this case, the transmission of data may be transmitted as a 1:1 relation, and may be simultaneously transmitted to different servers having a 1:N relation. In this case, a present transmission history table may be configured for each server.

Figure 5:
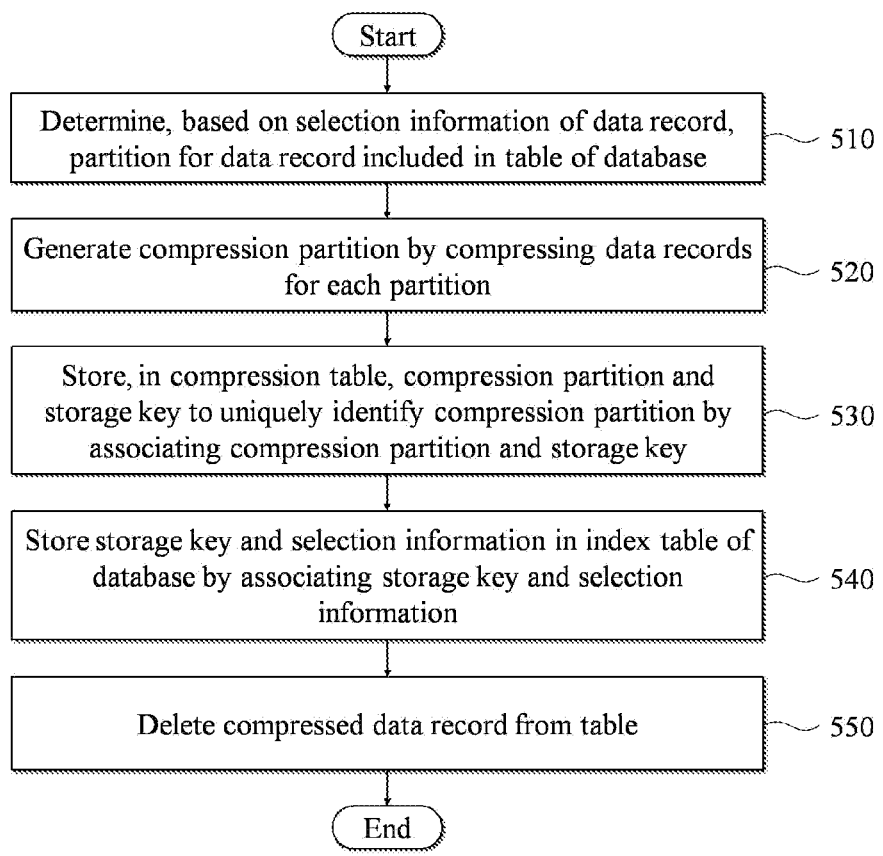
FIG. 5 is a flowchart illustrating an example of a process of archiving data through a first function in an embodiment of the present disclosure.

FIG. 5 is a flowchart illustrating an example of a process of archiving data through the first function in an embodiment of the present disclosure. The process according to the present embodiment may be performed by the computer device 200 that implements the target system 320 by using the first function provided by the data archiving system 310. In this case, the processor 220 of the computer device 200 may be implemented to execute a control instruction based on a code of an operating system or a code of at least one computer program included in the memory 210. In this case, the processor 220 may control the computer device 200 so that the computer device 200 executes steps 510 to 550 included in a method of FIG. 5 based on the control instruction provided by a code stored in the computer device 200. In this case, the code may include a code for the first function provided by the data archiving system 310.

In step 510, the computer device 200 may determine, based on selection information of a data record, a partition for the data record included in a table (archiving target table) of a database. In this case, the database may correspond to the database 321 of the target system 320 described with reference to FIG. 3. The selection information may include information a time for the data record and/or an arbitrary field value of the data record. The computer device 200 may determine the partition for the data record based on such information on the time and/or the field value. The table is a unit that forms a basic structure in which data is stored in a database. The table described in step 510 may be an archiving target table to be archived in order to reduce a capacity among a plurality of tables included in the database.

For example, the computer device 200 may select, as one partition, data records having field values within a given range. In this case, the field value may be determined as a field value of a field that is most frequently searched for in a table. The reason for this is that when archived data is subsequently searched for, efficiency of the search can be maximized by using index information generated based on a corresponding field value. Furthermore, for example, the computer device may select, as one partition, data records having information on time within a given range.

Furthermore, a partition may consist of a set of data records selected among all data records included in a table. At least one partition may be generated, and a partition may be generated by limiting, as a target, only some data records not all data records of a table if necessary. For example, a partition for archiving may be generated by using, as a target, only data records prior to 2015 except data records after 2015 in a table.

Meanwhile, the number of data records included in one partition may be determined by comprehensively analyzing and reviewing a total number of records included in a table, performance of a computer that searches a database, a search condition having high frequency in a database, etc.

In another embodiment, if an excess partition in which the number of data records is greater than a threshold value is present among selected partitions, the excess partition may be separated into a plurality of partitions in each of which the number of records is equal to or smaller than the threshold value. For example, a threshold value, that is, the number of data records which may be included in one partition, may be set to 100,000. However, if a selected partition includes the number of data records greater than the threshold value, this may be problematic because computer overload and inefficiency may be caused. Accordingly, if one partition has data records greater than 100,000 data records, several partitions may be generated by separating the one partition into a plurality of partitions each having a 100,000 unit. For example, if one partition has the number of 250,000 data records, the computer device 200 may separate such an excess partition into a total of three partitions, including two partitions each having the number of 100,000 data records and a partition having the number of 50,000 data records.

Meanwhile, since the plurality of partitions separated as described above has been classified based on classification criteria according to the same field value, there may be no method of distinguishing between the plurality of partitions. Accordingly, a serial number (e.g., 1, 2, 3, 4, . . . ) may be assigned to each of a plurality of separated record groups, and may be further stored in a serial number field of an index table. In this case, even when archived data is searched for, search may be performed by distinguishing between the plurality of separated partitions. Such a serial number may correspond to a sequence to be described later.

In step 520, the computer device 200 may generate a compression partition by compressing the data records for each partition. For example, the computer device 200 may generate the compression partition by compressing, into a binary object, data records included in a determined partition.

For example, in order to generate a compression partition, the computer device 200 may first store, in a buffer, a data record to be included in the compression partition. The size of the buffer in which the data record is stored may be determined based on a structure (the number of fields, the type and size of a field) of a table and a threshold value of the data record to be included in the compression partition. For example, if a table includes a total of three fields DATE (8 letters), NAME (30 letters) and AGE (four bytes of an integer) and a threshold value for the number of data records included in a compression partition is 100,000, when one letter is calculated as two bytes, the size of a buffer may be a minimum $100,000*(8*2+30*2+4)=8,000,000$ bytes (about 8 mega bytes). In this case, the computer device 200 may sequentially read both the data records included in the compression partition and field values of the data records, and may sequentially store the data records and the field values in the buffer.

Thereafter, the computer device 200 may generate a compression partition by compressing the data stored in the buffer. The compression partition may be a product of a binary object form generated by compressing the data stored in the buffer. In this case, in order to prevent a loss attributable to the compression, ZIP, CTW, LZ77, LZW, gzip, bzip2, DEFLATE, etc., that is, lossless compression algorithms, may be used.

In this case, the computer device 200 may generate a storage key that is uniquely assigned to each generated compression partition.

In step 530, the computer device 200 may store, in a compression table, the compression partition and the storage key to uniquely identify the compression partition by associating the compression partition and the storage key. It has been described above that the compressed data may be stored in a table of the database 321 of the target system 320 or a table of an external database. The compression table may include a field for storing a compression partition generated by compressing data for each partition and a field for storing a storage key uniquely assigned in a way to correspond to a corresponding compression partition. The storage key is a key including a value that is uniquely assigned for each compression partition. A value of a shared storage key for each compression partition may be stored in a field of a compression table corresponding to the storage key. Furthermore, the number of fields corresponding to the storage key may be one or more. When values of storage keys distributed and stored in one or more fields are combined, the field may be implemented so that a unique storage key is formed for each compression partition.

In step 540, the computer device 200 may store the storage key and the selection information in an index table of a database by associating the storage key and the selection information. For example, if selection information includes an arbitrary field value of a corresponding data record, in step 540, the computer device 200 may store a storage key and the arbitrary field value in a group index table by associating the storage key and the arbitrary field value. The storage key and the field value stored in the group index table may be used as an index for searching for a compressed and stored data record based on a search condition including an arbitrary field value. Furthermore, for example, if selection information includes information on time of a data record, the computer device 200 may store a storage key and the information on time in a period index table by associating the storage key and the information on time. The storage key and the information on time stored in the period index table may be used as an index for searching for a compressed and stored data record based on a search condition including information an arbitrary time. In other words, an index table including the group index table and/or the period index table may be used to obtain a storage key corresponding to the field value and/or the information on time that are included in the search condition. The storage key may be used to obtain, from a compression table, a compression partition corresponding to the storage key.

In step 550, the computer device 200 may delete a compressed data record from a table. An object of archiving a database by compressing the database is to reduce a storage space of the database. Accordingly, the computer device 200 can reduce the storage space of the database by deleting archived data records from a table. However, in an embodiment, a compressed data record may not be directly deleted from a table, but may be deleted from the table after a given period elapses.

Meanwhile, a deleted data record may be subsequently restored as a corresponding table. For example, the computer device 200 may search an index table for a storage key associated with identification information included in a restoration request in response to the restoration request for a deleted data record, and may search a compression table for a compression partition associated with the retrieved storage key. Thereafter, the computer device 200 may restore the deleted data record by releasing the compression of the retrieved compression partition, and may record the restored data record in a table based on the identification information. In this case, in order to identify a specific data record whose restoration has been requested among data records included in the compression partition, pieces of information of a key index table that is subsequently described may be used.

Step 510 to step 550 may be performed by using the first function provided by the data archiving system 310. In other words, the data archiving system 310 may provide the first function including a function for controlling the target system 320 to perform step 510 to step 550.

Figure 6:
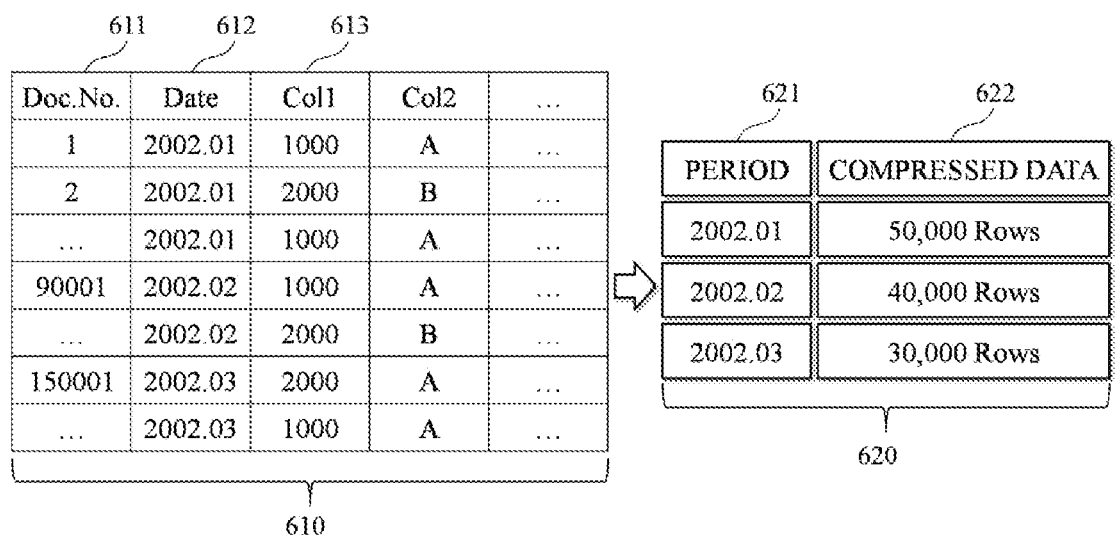
FIG. 6 is a diagram illustrating a first example of a structure of a compression table according to an embodiment of the present disclosure.

FIG. 6 is a diagram illustrating a first example of a structure of a compression table according to an embodiment of the present disclosure. In FIG. 6, a table 610 includes a Doc.No. field 611, a Date field 612 for time and a Col1 field 613 for a specific attribute. In this case, the computer device 200 may generate a compression partition by classifying and compressing data records of the table 610 based on a field value of the Date field 612 of the table 610 or a field value of the Col1 field 613 thereof, that is, information on time, as selection information. In this case, the computer device 200 may generate a compression table 620 by associating and storing a storage key for uniquely identifying a compression partition and the corresponding compression partition. For example, the compression table 620 according to the embodiment of FIG. 6 may include an OBJECT ID field 621 having the storage key as a field value and a COMPRESSED DATA field 622 having the compression partition as a field value.

Figure 7:
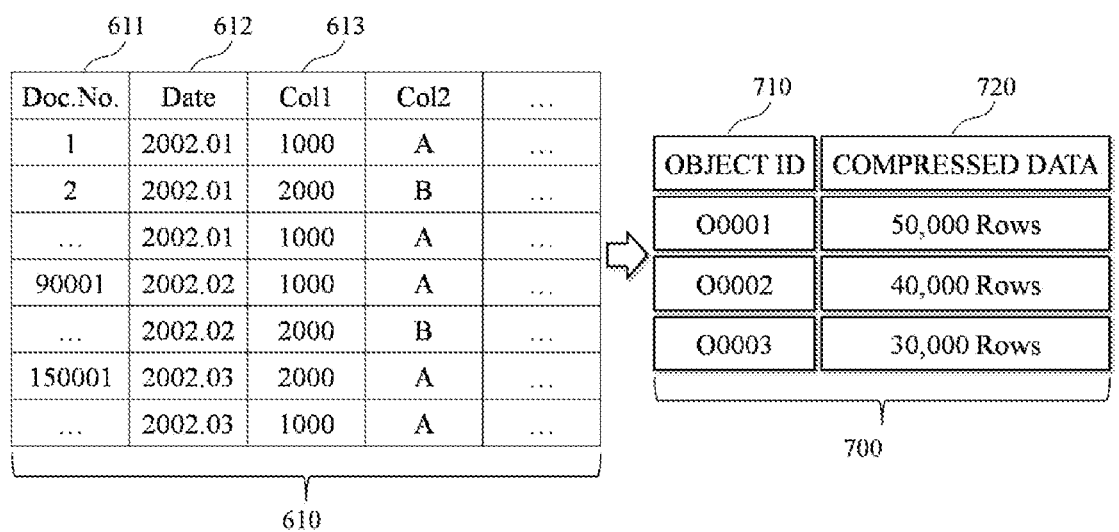
FIG. 7 is a diagram illustrating a second example of a structure of a compression table according to an embodiment of the present disclosure.
Figure 9:
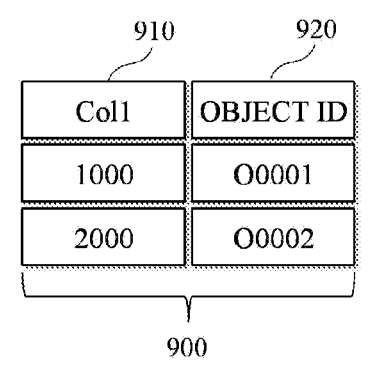

FIG. 7 is a diagram illustrating a second example of a structure of a compression table according to an embodiment of the present disclosure. FIG. 8 is a diagram illustrating an example of a structure of a period index table according to an embodiment of the present disclosure. FIG. 9 is a diagram illustrating an example of a structure of a group index table according to an embodiment of the present disclosure.

FIG. 7 describes another embodiment in which a compression table 700 is generated through the table 610 described with reference to FIG. 6. For example, the computer device 200 may generate a compression partition by classifying and compressing data records of the table 610 based on a field value of the Date field 612 of the table 610, that is, information on time, as selection information. Furthermore, the computer device 200 may generate the compression table 700 by associating and storing the selection information and the corresponding compression partition. For example, the compression table 700 according to the embodiment of FIG. 7 may include a PERIOD field 710 having the information on time as a field value and a COMPRESSED DATA field 720 having the compression partition as a field value.

Meanwhile, FIG. 8 illustrates an example of a period index table 800 which may be generated and used if the compression table 700 includes a compression partition generated by classifying and compressing data records based on a field value (information on time) of the Date field 612. In this case, the period index table 800 may include a PERIOD field 810 having information on time as a field value and an OBJECT ID field 820 having a storage key as a field value. For example, when receiving a search condition having information on time (e.g., "2020.01") as selection information, the computer device 200 may search the period index table 800 for a storage key (e.g., in the period index table 800, a storage key "O0001" corresponding to information on time "2020.01") by using the information on time included in the search condition, and may search the compression table 620 for a compression partition corresponding to a storage key (e.g., in the compression table 620, a compression partition of "50,000 Rows" corresponding to the storage key "O0001") by using the retrieved storage key.

Furthermore, FIG. 9 illustrates an example of a group index table 900 which may be generated and used if the compression table 600 includes a compression partition generated by classifying and compressing data records based on a field value of the Col1 field 613. In this case, the group index table 900 may include a PERIOD field 910 having a field value of the Col1 field 613 as its own field value and an OBJECT ID field 920 having a storage key as a field value. For example, when receiving a search condition including a field value (e.g., "1000") of the Col1 field 613 as selection information, the computer device 200 may search the group index table 900 for a storage key (e.g., in the group index table 900, a storage key "O0001" corresponding to the field value "1000") by using the field value included in the search condition, and may search the compression table 600 for a compression partition corresponding to the storage key (e.g., in the compression table 600, a compression partition of "50,000 Rows" corresponding to the storage key "O0001") by using the retrieved storage key.

Figure 10:
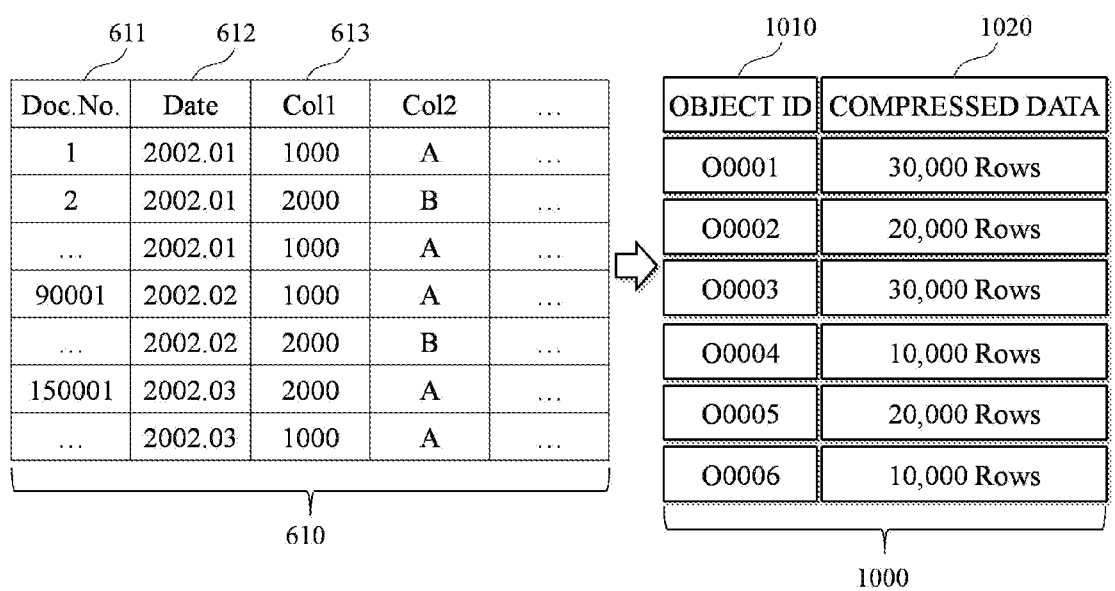
FIG. 10 is a diagram illustrating a third example of a structure of a compression table according to an embodiment of the present disclosure.
Figure 11:
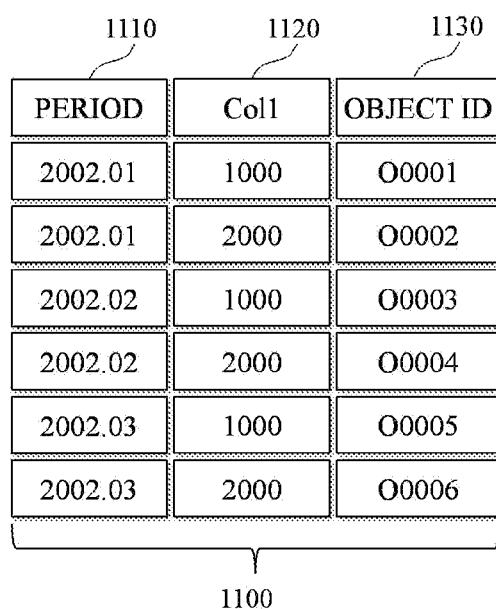
FIG. 11 is a diagram illustrating an example of a structure of an index table having a form in which the period index table and the group index table have been combined in an embodiment of the present disclosure.

FIG. 10 is a diagram illustrating a third example of a structure of a compression table according to an embodiment of the present disclosure. FIG. 11 is a diagram illustrating an example of a structure of an index table having a form in which the period index table and the group index table have been combined in an embodiment of the present disclosure.

FIG. 10 describes still another embodiment in which a compression table 1000 is generated through the table 610 described with reference to FIG. 6. For example, the computer device 200 may generate a compression partition by classifying and compressing data records of the table 610 based on two field values, including a field value of the Date field 612 of the table 610, that is, information on time, and a field value of the Col1 field 613 of the table 610.

As a more detailed example, the computer device 200 may generate a first compression partition by compressing data records in each of which a field value of the Date field 612 is "2002.01" and a field value of the Col1 field 613 is "1000", may generate a second compression partition by compressing data records in each of which a field value of the Date field 612 is "2002.01" and a field value of the Col1 field 613 is "2000", may generate a third compression partition by compressing data records in each of which a field value of the Date field 612 is "2002.02" and a field value of the Col1 field 613 is "1000", may generate a fourth compression partition by compressing data records in each of which a field value of the Date field 612 is "2002.02" and a field value of the Col1 field 613 is "2000", may generate a fifth compression partition by compressing data records in each of which a field value of the Date field 612 is "2002.03" and a field value of the Col1 field 613 is "1000", and may generate a sixth compression partition by compressing data records in each of which a field value of the Date field 612 is "2002.03" and a field value of the Col1 field 613 is "2000."

In this case, the computer device 200 may generate the compression table 1000 by associating and storing a storage key for uniquely identifying a compression partition and the corresponding compression partition. For example, the compression table 1000 according to the embodiment of FIG. 10 may include an OBJECT ID field 1010 having a storage key as a field value and a COMPRESSED DATA field 1020 having a compression partition as a field value.

Meanwhile, FIG. 11 illustrates an example of an index table 1100 having a form in which the period index table and the group index table have been combined. In this case, the index table 1100 may include a PERIOD field 1110 having information on time as a field value, a Col1 field 1120 having a field value of the Col1 field 613 as its own field value, and an OBJECT ID field 1130 having a storage key as a field value. For example, when receiving a search condition including information on time (e.g., "2020.02") and a field value (e.g., "1000") of the Col1 field 613 as selection information, the computer device 200 may search the index table 1100 for a storage key (e.g., a storage key "O0003" in the index table 1100) that satisfies both the information on time and the field value included in the search condition, and may search the compression table 1000 for a compression partition corresponding to the retrieved storage key (e.g., in the compression table 1000, a compression partition of "30,000 Rows" corresponding to the storage key "O0003") by using the retrieved storage key.

Figure 12:
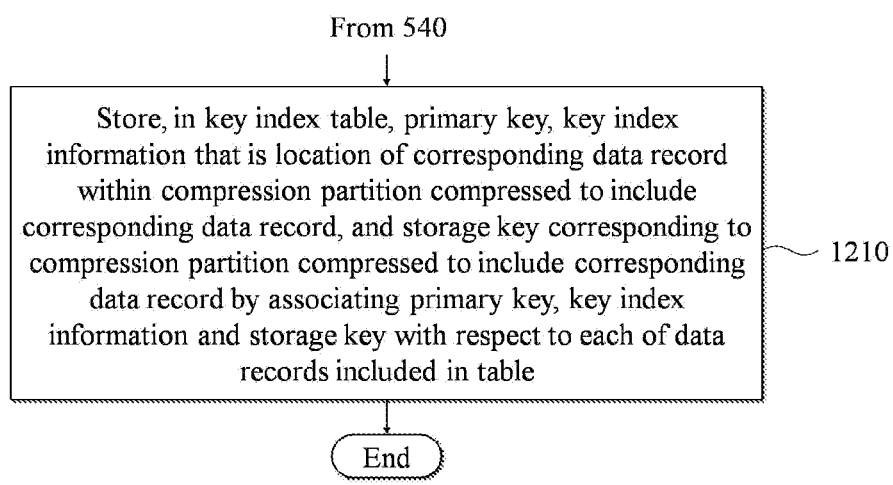
FIG. 12 is a flowchart illustrating still another example of a process of archiving data through the first function in an embodiment of the present disclosure.

FIG. 12 is a flowchart illustrating still another example of a process of archiving data through the first function in an embodiment of the present disclosure. The process according to the present embodiment may further include step 1210 after step 540 described with reference to FIG. 5.

In step 1210, the computer device 200 may store, in a key index table, a primary key, key index information, that is, a location of a corresponding data record within a compression partition compressed to include the corresponding data record, and a storage key corresponding to the compression partition compressed to include the corresponding data record by associating the primary key, the key index information and the storage key with respect to each of data records included in a table. Step 1210 may be performed by using the first function provided by the data archiving system 310. In other words, the data archiving system 310 may provide the first function including a function for controlling the target system 320 to perform step 1210.

The primary key may mean a corresponding value in a field having a value that is uniquely identified for each record in a database, and may also be called a basic key, a main key or a unique key. Furthermore, one or more primary keys may be present in one table. Furthermore, the key index information is information indicating where a data record having a value of a specific primary key is stored within a compression partition. For example, information on a storage sequence of a data record stored at a 1000-th position, among information on 100,000 data records included in a compression partition, may be stored as key index information.

Meanwhile, the reason why the primary key is stored in the key index table is for enabling a table, that is, a search target, to be directly searched based on the primary key in addition to another field value and information on time. That is, when a user attempts to search a table for a data record having a specific primary key while inputting the specific primary key, the key index table may be used. More specifically, the computer device 200 may search the key index table for key index information of a data record having the specific primary key and a storage key. In this case, the computer device 200 may obtain, from a compression table, a compression partition corresponding to the obtained storage key by using the obtained storage key, and may search the compression partition for a specific data record desired by the user by using the key index information. As already described, such key index information of the key index table may be used to identify a data record having a specific condition among data records included in a compression partition in restoring the data record having the specific condition in a table.

Figure 13:
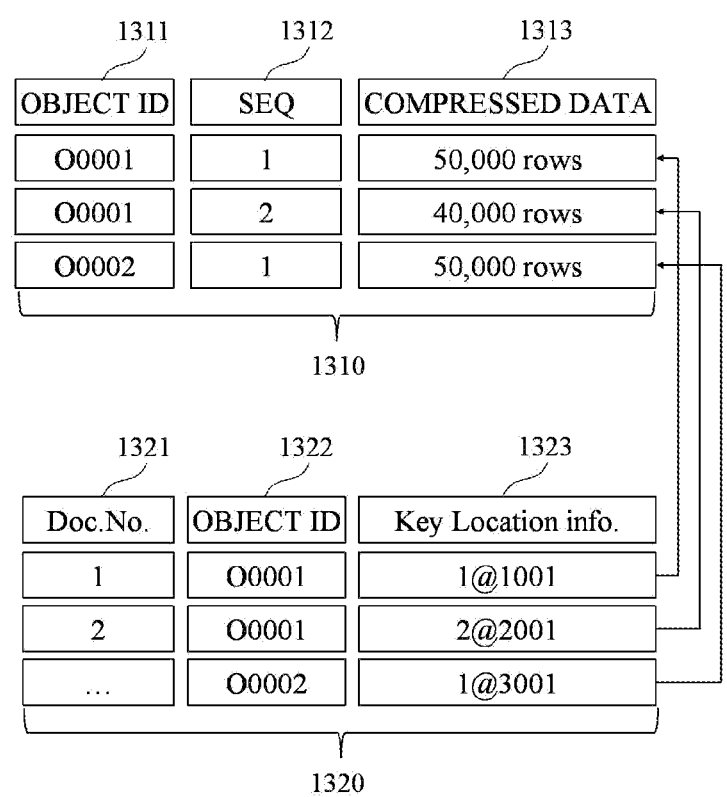
FIG. 13 is a diagram illustrating an example of structures of a compression table and a key index table according to an embodiment of the present disclosure.

FIG. 13 is a diagram illustrating an example of structures of a compression table and a key index table according to an embodiment of the present disclosure.

A compression table 1310 may include an OBJECT ID field 1311 having a storage key as a field value, a SEQ field 1312 having a processing order (sequence) of a target table as a field value and a COMPRESSED DATA field 1313 having a compression partition as a field value. The sequence may define a processing sequence in which a parent table is first extracted and a child table is processed by using data of the extracted parent table if the parent table and the child table are present.

The key index table 1320 may include a Doc.No. field 1321 having a primary key as a field value as already described, an OBJECT ID field 1322 having a storage key as a field value and a Key Location info. field 1323 having key index information as a field value. For example, in key index information 1@1001, "1" ahead of "@" may indicate a sequence corresponding to a field value of the SEQ field 1312, and "1001" behind "@" may indicate a 1,001-th data record among data records included in a corresponding compression partition. As a more detailed example, the first record of the key index table 1320 may indicate that a data record having a primary key of "1" has been included as a 1,001-th data record among data records of a compression partition in which a storage key is "O0001" and a sequence is "1." Likewise, the second record of the key index table 1320 may indicate that a data record having a primary key of "2" has been included as a 2,001-th data record among data records of a compression partition in which a storage key is "O0001" and a sequence is "2."

As described above, the key index information may include information on a location of a specific data record within a compression partition. The number of data records to be inquired based on a search condition of a user can be reduced by using a key index table (e.g., the key index table 1320 of FIG. 13) including such key index information, a primary key and a storage key.

In another embodiment, the computer device 200 may search a connection table, connected to a first table (e.g., the table described in step 410), for a data record having the same primary key as a data record included in a first table among data records included in a second compression partition generated by compressing data records through a primary key, and may further store subindex information, that is, a location of the retrieved data record within the second compression partition, with respect to a data record having the same primary key in a key index table. The connection table is a table connected to the first table through the primary key. That is, the primary key may be present in both the first table and the connection table. The second compression partition may be data generated by compressing data records in a connection table when the corresponding connection table connected to the first table through the primary key is present. In this case, the second compression partition may be generated in the same manner as that of the compression partition described with reference to FIG. 4, and may be stored in a compression table along with a unique storage key like a compression partition. The subindex information is information on where a data record having a specific primary key is stored within a second compression partition. For example, information on a storage sequence of a data record stored at a 1000-th position among information on 100,000 data records included in a second compression partition may be stored as subindex information. For example, with respect to a field having a connection table connected to a first table through a primary key in a database and being not present in the first table, but being present in the connection table, a user may require field value information of the corresponding field. In this case, the computer device 200 may further store subindex information with respect to a data record having the same primary key in a key index table so that even the connection table can be subsequently searched.

In still another embodiment, if multiple connection tables are present with respect to a first table, the computer device 200 may collect and compress subindex information for connection tables, and may store the subindex information in a key index table as new subindex information. For example, the computer device 200 may collect all pieces of subindex information for locations of data records having the same primary key in a connection table within two or more second compression partitions, may compress the collected values, and may store, as new subindex information, the compressed values in a data record including a value of the same primary key in the key index table.

Figure 14:
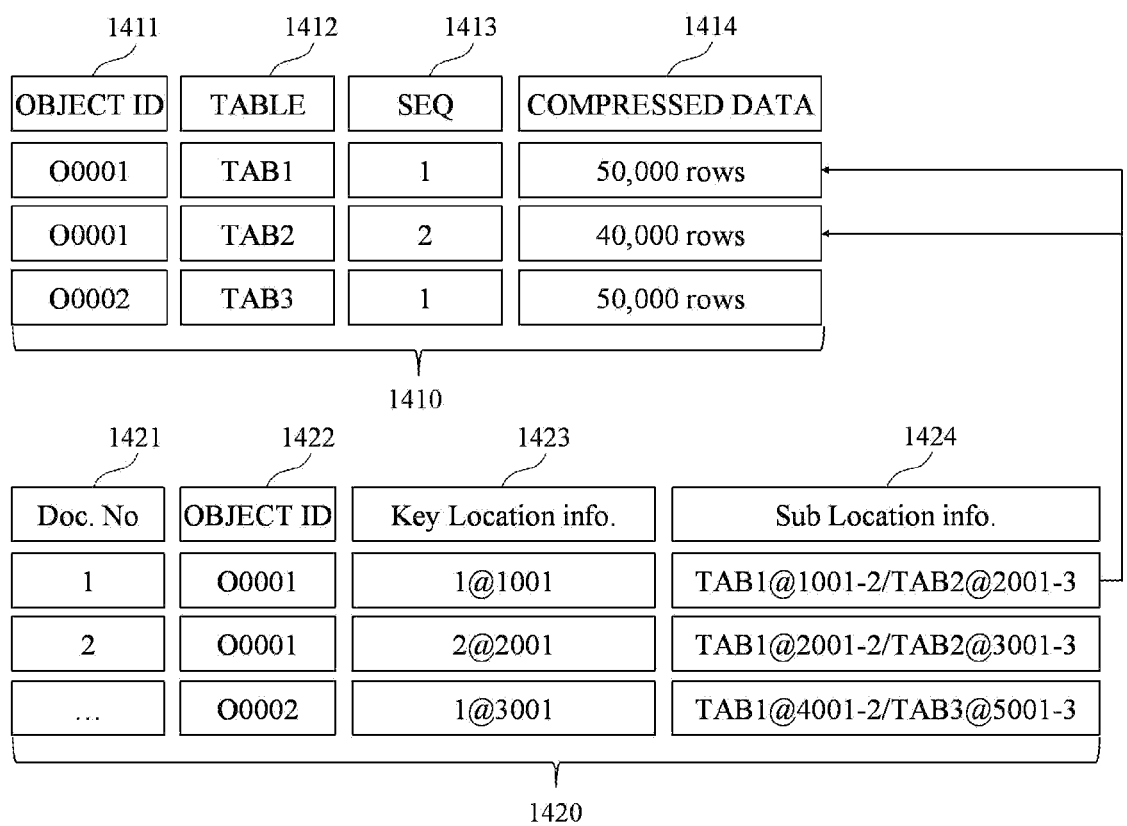
FIG. 14 is a diagram illustrating another example of structures of a compression table and a key index table according to an embodiment of the present disclosure.

FIG. 14 is a diagram illustrating another example of structures of a compression table and a key index table according to an embodiment of the present disclosure.

A compression table 1410 may include an OBJECT ID field 1411 having a storage key as a field value, a TABLE field 1412 having an identifier of a table as a field value, a SEQ field 1413 having a sequence as a field value and a COMPRESSED DATA field 1414 having a compression partition as a field value. The TABLE field 1412 may include an identifier of a table as a field value. Accordingly, it is possible to identify that a corresponding compression partition includes data records extracted from which table.

A key index table 1420 according to the present embodiment may include a Doc.No. field 1421 having a primary key as a field value, an OBJECT ID field 1422 having a storage key as a field value, a Key Location info. field 1423 having key index information as a field value and a Sub Location info. field 1424 having subindex information as a field value.

For example, the first record of the key index table 1420 may indicate that a data record having a primary key of "1" has been included as a 10,001-th data record among data records of a compression partition in which a storage key is "O0001" and a sequence is "1." In this case, a field value "TAB1@1001-2/TAB2@2001-3" of the Sub Location info. field 1424 indicates a location within a second compression partition generated with respect to a connection table of a data record having the primary key of "1." For example, in the field value "TAB1@1001-2/TAB2@2001-3", "TAB1" and "TAB2" ahead of "@" may mean connection tables connected through the same primary key. "1001-2" behind "@" indicates two data records (a 1,001-th data record (first data record) and a 1,002-th data record (second data record))

from a 1,001-th data record among data records included in a second compression partition for a connection table "TAB1." Furthermore, "2001-3" behind "@" indicates three data records (a 2,001-th data record (third data record), a 2,002-th data record (fourth data record) and a 2,003-th data record (fifth data record)) from a 2,001-th data record among data records included in a second compression partition for a connection table "TAB2." In this case, all of the data records from the first data record to the fifth data record may be identified by the same primary key.

Figure 15:
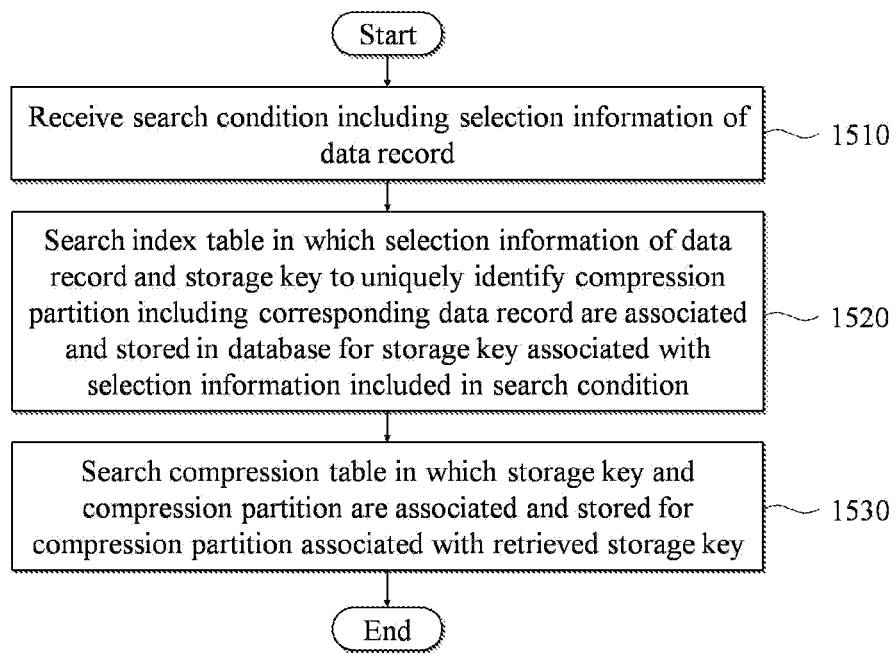
FIG. 15 is a diagram illustrating an example of a process of searching for archived data through a second function in an embodiment of the present disclosure.

FIG. 15 is a diagram illustrating an example of a process of searching for archived data through the second function in an embodiment of the present disclosure. The process according to the present embodiment may be performed by the computer device 200 that implements the target system 320 by using the second function provided by the data archiving system 310.

In step 1510, the computer device 200 may receive a search condition including selection information of a data record. Such selection information may include an arbitrary field value of a data record to be searched for and/or information on time of the corresponding data record. The field value and/or the information on time included in the selection information may be included in the form of a range.

In step 1520, the computer device 200 may search an index table in which selection information of a data record and a storage key to uniquely identify a compression partition including the corresponding data record are associated and stored in a database for a storage key associated with the selection information included in the search condition. As already described, the index table may include a group index table and/or a period index table. As described above, the group index table may associate and store a specific field value and a storage key, and the period index table may associate and store information on time and a storage key. Accordingly, the computer device 200 may search the group index table and/or the period index table for a field value included in the selection information and/or a storage key corresponding to the information on time. For example, if selection information includes an arbitrary field value of a data record, the computer device 200 may search the group index table in which a storage key and an arbitrary field value are associated and stored for a storage key associated with the arbitrary field value included as the selection information of a search condition. Furthermore, for example, if selection information includes information on time of a data record, the computer device 200 may search the period index table in which a storage key and information on time are associated and stored for a storage key associated with the information on time included as the selection information of a search condition.

In step 1530, the computer device 200 may search a compression table in which a storage key and a compression partition are associated and stored for a compression partition associated with the retrieved storage key. As already described, the compression table associates and stores a compression partition and a storage key to uniquely identify the compression partition. Accordingly, the computer device 200 may search such a compression table for a corresponding compression partition through a storage key.

As already described, if a key index table is further used, a user may use a primary key for search. As described above, the key index table may associate and store a primary key, key index information, that is, a location of a data record within a compression partition compressed to include the corresponding data record, and a storage key corresponding to the compression partition compressed to include the corresponding data record, with respect to each of data record included in an arbitrary table of a database. In this case, if a search condition further includes a primary key of the data record, the computer device 200 may search the key index table for key index information, associated with the primary key further included in the search condition, and a storage key. Thereafter, the computer device 200 may search the compression partition, retrieved in step 1530, for a specific data record according to the search condition further based on the retrieved key index information and storage key.

Furthermore, if a connection table connected to an arbitrary table through the primary key is present, the key index table may further include subindex information, that is, a location in a second compression partition of a data record, with respect to the second compression partition generated by compressing data records in the connection table. Accordingly, if a search condition further includes a primary key, the computer device 200 may further search the key index table for subindex information associated with the primary key further included in the search condition, and may further search a second compression partition for a the data record according to the search condition based on the second compression partition and the subindex information. Accordingly, the computer device 200 can also obtain a field value of a connection table connected to a first table through a primary key in addition to a field value of the first table to be searched for with respect to a specific data record.

Meanwhile, as already described, the compression table may also include a compression table of a database of another computer device connected to the computer device 200 over a network. In this case, in step 1530, the computer device 200 may search the compression table of a database of another computer device for a compression partition associated with the storage key retrieved in step 1520 over a network.

Step 1510 to step 1530 may be performed by using the second function provided by the data archiving system 310. In other words, the data archiving system 310 may provide the second function including a function for controlling the target system 320 to perform step 1510 to step 1530.

Figure 16:
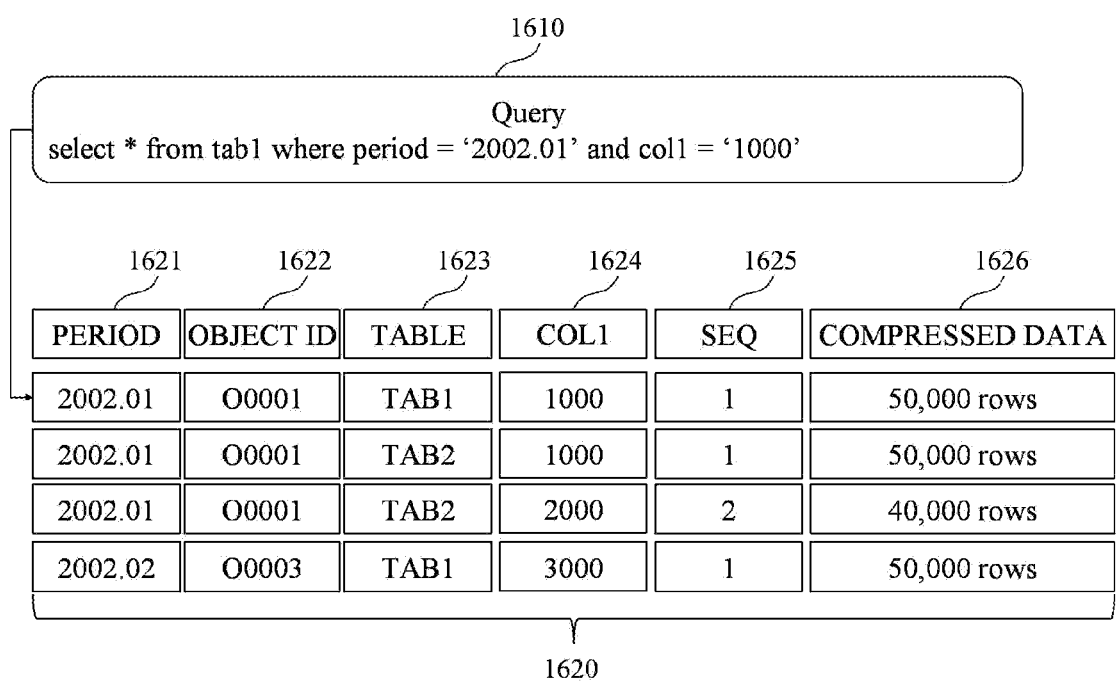
FIGS. 16 and 17 are diagrams illustrating examples in which archived data is searched for in an embodiment of the present disclosure.
Figure 17:
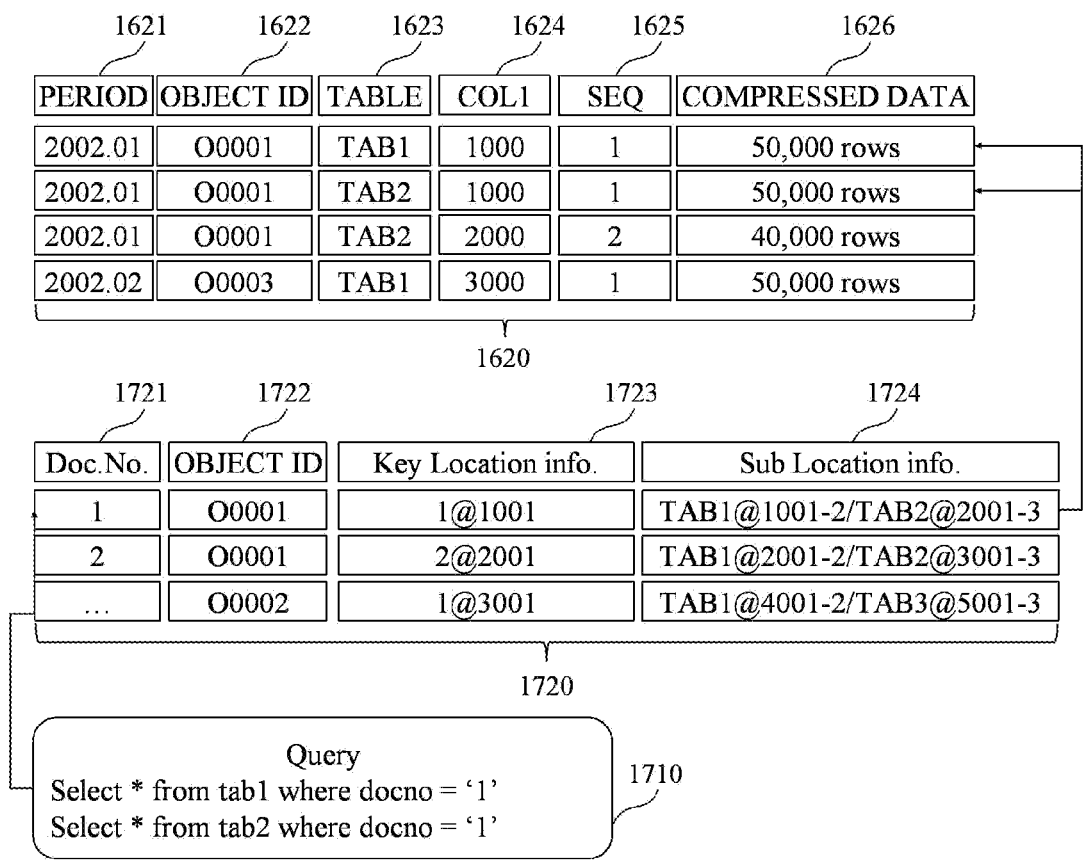

FIGS. 16 and 17 are diagrams illustrating examples in which archived data is searched for in an embodiment of the present disclosure.

FIG. 16 illustrates an example in which archived data is searched for in a compression table 1620 through a query 1610. In the embodiment of FIG. 16, the compression table 1620 includes a PERIOD field 1621, a COL1 field 1622, a TABLE field 1623, an OBJECT ID field 1624, a SEQ field 1625 and a COMPRESSED DATA field 1626 as a form combined with an index table. In an embodiment, the PERIOD field 1621 and the COL1 field 1622 may be present in a separate index table. In this case, in order to connect the compression table 1620 and the index table, the OBJECT ID field 1624 may be present in each of the two tables. In an embodiment, the TABLE field 1623 and the SEQ field 1625 may also be present in the index table.

In this case, the query 1610 may be an instruction to search a table "TAB1" for a data record in which a field value of the PERIOD field 1621 is "2002.01" and a field value of the COL1 field 1622 is "1000." In this case, the computer device 200 may confirm that a data record corresponding to the query 1610 is a compression partition stored in the COMPRESSED DATA field 1626 of the first record of the compression table 1620 in the compression table 1620. Accordingly, the computer device 200 may release the compression of the corresponding compression partition, and may provide, as a result of the search, data records (data records of "50,000 rows") included in the corresponding compression partition.

FIG. 17 illustrates an example in which archived data is searched for in the compression table 1620 through a query 1710. In the embodiment of FIG. 17, the query 1710 may use a key index table 1720 because a primary key is used as a search condition. The key index table 1720 includes a Doc.No. field 1721, an OBJECT ID field 1722, a Key Location Info. field 1723 and a Sub Location Info. field 1724.

In this case, the query 1710 may mean an instruction to search a table "TAB1" and a table "TAB2" for a data record in which a field value of the Doc.No. field 1721 as a primary key is "1." In this case, the computer device 200 may confirm the first record in which a field value of the Doc.No. field 1721 is "1" in the key index table 1720, and may search the compression table 1620 for data records each having the primary key of "1" based on a field value of the Sub Location Info. field 1724 of the first record. For example, the computer device 200 may extract, from the compression table 1620, the data records each having the primary key of "1" based on subindex information "TAB1@1001-2/ TAB2@2001-3" of the first record of the key index table 1720 in which the field value of the Doc.No. field 1721 is "1." In this case, although all of the data records of compression partitions are not searched for through locations included in subindex information, data records having a value of a specific primary key may be easily and quickly searched for.

Referring back to FIG. 3, the data archiving system 310 can optimize data of the target system 320 and the storage system 330 by using a data inquiry log in an embodiment in which another system (e.g., a cloud storage system) outside the target system 320 includes the storage system 330. For example, the data archiving system 310 can continuously optimize a data capacity and a user access speed between the target system 320 and the storage system 330 by analyzing at least one of (1) the past table access log of an on-premise database (owned and operated as its own equipment by a company not a cloud environment), (2) the amount of access predicted by using machine learning based on the past table access log and (3) an access log before and after data transitions to the storage system 330.

Figure 18:
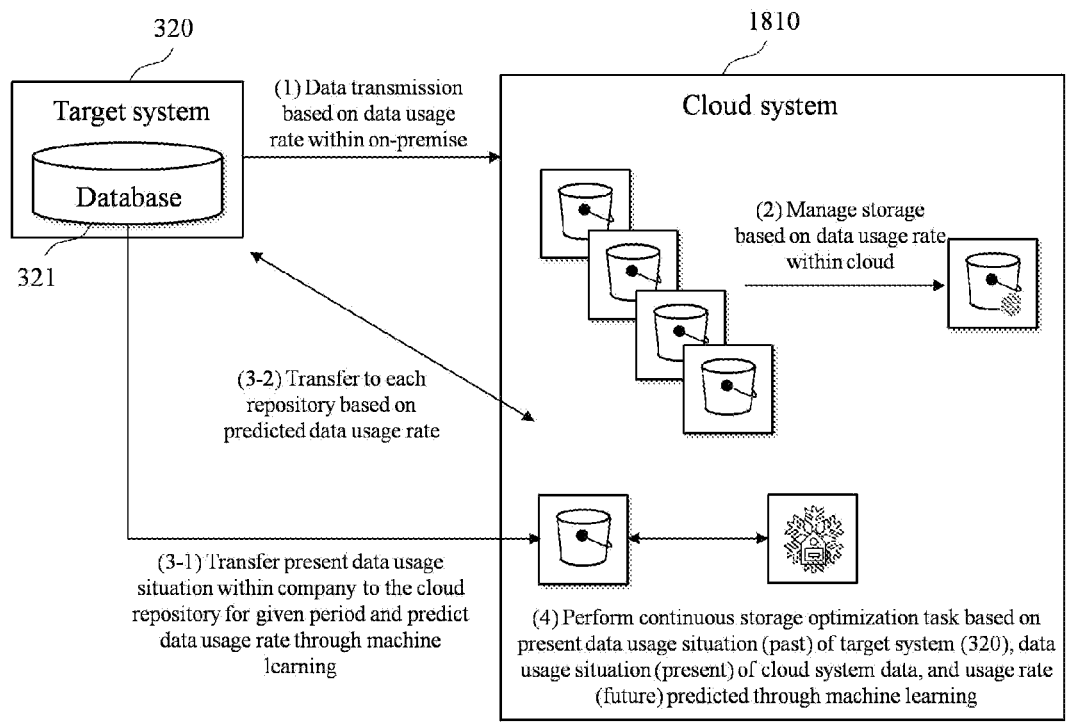
FIG. 18 is a diagram illustrating an example of a process for effectively storing data in an embodiment of the present disclosure.

FIG. 18 is a diagram illustrating an example of a process for effectively storing data in an embodiment of the present disclosure. FIG. 18 indicates the target system 320 and a cloud system 1810. In such an embodiment of FIG. 18, both the storage system 330 and the data archiving system 310 may be implemented in the cloud system 1810. In order to effectively store data in a remote repository (the storage system 330 implemented in the cloud system 1810), the data archiving system 310 may differentially manage storage classes based on data utilization rates. For example, the data archiving system 310 may provide the target system 320 with a function for controlling the target system 320 to transmit data based on a data utilization rate in an on-premise database. In this case, the data archiving system 310 may separate present data usage situations of the target system 310 into respective classes by analyzing the present data usage situations through such a function, and may then separate data into the classes before transmitting the data to the cloud system 1810. In this case, the cloud system 1810 may also include class storage for each class, and may store data having a class corresponding specific class storage.

Furthermore, the data archiving system 310 may separate and store a present use situation of data transmitted to the cloud system 1810 by monitoring the present use situation for each business object or for each period. For example, the data archiving system 310 may manage storage based on a data utilization rate within a repository of the cloud system 1810.

Meanwhile, the data archiving system 310 may control the present data usage situation of the target system 320 to be transmitted to the cloud system 1810, may analyze the utilization of data by using machine learning, and may then store analyze the utilization of data in each class storage. For example, the data archiving system 310 may control the target system 310 to transfer a present data usage situation within a company to the cloud system 1810 for a given period, and may predict a data utilization rate based on the application of machine learning to the transferred present data usage situation. Furthermore, the data archiving system 310 may process the transfer of data between the target system 320 and the cloud system 1810 so that the data can be optimized based on the predicted data utilization rate. For example, data having a data utilization rate equal to or greater than a first threshold value, among data stored in a repository (the storage system 320) of the cloud system 1810, may be transferred to a repository (the database 321) of the target system 320. Data having a data utilization rate equal to or smaller than a second threshold value, among the data stored in the repository of the target system 320, may be transferred to the repository of the cloud system 1810. The compression or compression release of data described with reference to the embodiments of FIGS. 3 to 17 may be required for the transfer of the data.

As described above, the data archiving system 310 can perform a continuous storage optimization task based on a present data usage situation (the past) of the target system 320, a present data usage situation (present) of the cloud system and a data utilization rate (future) predicted through machine learning.

As still another embodiment, the data archiving system 310 may provide a function for performance optimization of the target system 320. For example, a case where the target system 320 is disposed in a cloud environment in the form of an instance may be taken into consideration. In this case, for example, after data of the target system 320 is deleted (or after the usage of a storage space is reduced through the aforementioned continuous storage optimization task), the data archiving system 310 may monitor overall performance (a CPU, the amount of a memory used, a system response speed, etc.) of the target system 320, disposed in the cloud environment in the form of an instance, based on a database capacity of the target system 320, and can reduce costs of the target system 320 by changing the specification of the target system 320 into a server type capable of reducing costs based on the monitored performance. For example, the data archiving system 310 may provide a function for instance optimization in which both CPU and memory efficiency are taken into consideration not a data volume optimization viewpoint. To this end, the data archiving system 310 may review the optimization possibility of an additional resource attributable to a data volume reduction. As a more detailed example, the data archiving system 310 may measure a time for each flow by analyzing technical bill of material (BOM) of a program having high frequency for a recent given period (e.g., 1 year) and an internal structure of a program, and may reduce a processing time of database-related logic, thereby reducing specifications, such as a CPU and a memory. Furthermore, the data archiving system 310 may change an instance for implementing the target system 320 into an instance having a class that is economically one step lower than a class of an initial configuration instance. A system response rate, a CPU usage rate, a processing time, a database response time, etc. in addition to technical BOM of a program and an internal structure may be required for the measurement of a time for each flow.

As still another embodiment, the data archiving system 310 may provide a function for data de-identification. When archived data is collected, de-identification may be required according to business requirements and/or legal requirements. Alternatively, de-identification may be required in order to use, in another system not the target system 320, data archived in the storage system 330. FIG. 19 is a diagram illustrating an example of a process for de-identifying data in an embodiment of the present disclosure.

Figure 20:
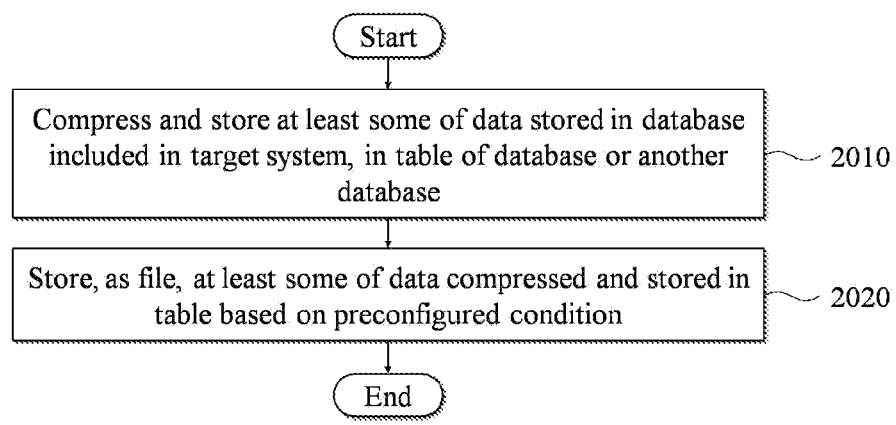
FIG. 20 is a diagram illustrating another example of a data archiving method according to an embodiment of the present disclosure.

FIG. 20 is a diagram illustrating another example of a data archiving method according to an embodiment of the present disclosure. The data archiving method according to the present embodiment may be performed by the computer device 200 that implements the aforementioned data archiving system 310. In this case, the processor 220 of the computer device 200 may be implemented to execute a control instruction according to a code of an operating system or a code of at least one computer program included in the memory 210. In this case, the processor 220 may control the computer device 200 so that the computer device 200 performs steps 2010 to 2020 included in the method of FIG. 20 in response to a control instruction provided by a code stored in the computer device 200. Furthermore, the computer program may correspond to the aforementioned archiving solution program.

In step 2010, the computer device 200 may compress and store at least some of data stored in a database included in a target system, in a table of the database or another database. In this case, the target system may correspond to the aforementioned target system 320, and the database may correspond to the database 321. Meanwhile, the another database may include a database included in external system (e.g., a data archiving system 310 different from the target system 310 or a third party system) of the target system. A method of compressing and storing data in a table has been described in detail with reference to FIGS. 3 to 14. A method of searching for data compressed and stored in a table has been described in detail with reference to FIGS. 15 to 19. If data is compressed and stored in a table, the capacity of data stored in a database included in a target system can be greatly reduced and the computer device 200 can search archived data for desired data easily and rapidly because data is stored in the table through primary archiving in the state in which the data has been compressed as already described above. Thereafter, as the necessity for search for the primarily archived data is reduced, the primarily archived data in the table can be secondarily archived as a file.

In step 2020, the computer device 200 may store, as a file, at least some of the data compressed and stored in the table based on a preconfigured condition. For example, the preconfigured condition may include at least one of a first condition in which a secondary archiving command from an administrator of the target system is received, a second condition in which a retention period of the data compressed and stored in the table elapses, a third condition in which a search request for the data compressed and stored in the table is not generated for a preset first period and a fourth condition in which a search request for a data compressed and stored in the table is equal to or smaller than a preset number for a preset second period. In this case, in relation to the first condition, the secondary archiving command may be an explicit command to store, as a file, at least some of the data compressed and stored in the table. In this case, the computer device 200 may secondarily archive data specified by the archiving command by storing the data as a file. Furthermore, in relation to the second condition, the retention period may be configured in the data compressed and stored in the table. In this case, the computer device 200 may secondarily archive data whose retention period has elapsed, among the data compressed and stored in the table, by storing the data as a file. Furthermore, in relation to the third condition, the computer device 200 may secondarily archive data for which a search request has not been generated for the first period, among the data compressed and stored in the table, by storing the data as a file. Furthermore, in relation to the fourth condition, the computer device 200 may secondarily archive data for which a search request is equal to or smaller than a preset number for the second period, among the data compressed and stored in the table, by storing the data as a file. In addition, it may be easily understood that at least some of the data compressed and stored in the table can be stored as a file and secondarily archived according to various conditions. For example, as described above, the data archiving system 310 can optimize data of the target system 320 and the storage system 330 by using a data inquiry log in an embodiment in which another system (e.g., a cloud storage system) outside the target system 320 includes the storage system 330. In this case, as described above, the data archiving system 310 can continuously optimize a data capacity and a user access speed between the target system 320 and the storage system 330 by analyzing at least one of (1) the past table access log of an on-premise database (owned and operated as its own equipment by a company not a cloud environment), (2) the amount of access predicted by using machine learning based on the past table access log and (3) an access log before and after data transitions to the storage system 330. In this case, the computer device 200 may process secondary archiving based on the amount of access predicted through such machine learning. In this case, the preconfigured condition may also include a condition in which the predicted amount of access is equal to or smaller than a threshold value.

Meanwhile, in step 2020, the computer device 200 may store the file in a local repository of the target system or may store the file in a repository of an external system (e.g., a file server or a cloud server) of the target system. If secondarily archived data is stored as a file and a search request for the secondarily archived data is present, the data (compressed data) stored as the file may be restored to a table again, and desired data may be searched for by using the search method described with reference to FIGS. 15 to 19.

Meanwhile, step 2010 and step 2020 may be a process of providing, by the computer device 200, a function so that the target system processes primary archiving and secondary archiving. For example, in step 2010, the computer device 200 may provide a function for controlling the target system to compress and store at least some of data, stored in a database included in the target system, in a table of the database or another database. In step 2020, the computer device 200 may provide a function for controlling the target system to store, as a file, at least some of the data compressed and stored in the table based on a preconfigured condition.

Referring back to FIG. 3, the data archiving system 310 may transmit archived data of the target system 320 to the storage system 330 in order to store the archived data. In this case, the data archiving system 310 may optimize the transmission of the archived data. Archiving target data stored in the database 321 of the target system 320 may be grouped into objects each being a minimum process processing unit on the basis of dependency between tables within the database. In this case, the dependency between tables may mean that two table include respective data identified through the same key value. In this case, data identified through the same key value in tables having dependency may include at least one different field.

For example, the data archiving system 310 may group and classify into objects by analyzing a table of the database 321. The object is a minimum process processing unit, and may include one or more tables. As a more detailed example, tables each having a minimum process processing unit may include tables generated for a material master, a customer master, a price condition, a customer credit, a sales order, billing, a financial statement, an account balance, profitability analysis, an interface log, a user logon history, etc. Such a minimum process processing unit may be variously defined depending on a configuration of a company that maintains and manages a corresponding database.

Furthermore, the data archiving system 310 may classify an object for each module. In this case, the module may mean an application area according to each process. Such an application area may be variously defined as production, sales, materials, financial accounting, management accounting, infrastructure, telecommunications, the industry, etc. Such a module may also be variously defined depending on a configuration of a company that maintains and manages a database.

Furthermore, the data archiving system 310 may classify an object for each type. The type for classifying an object may include master data, transaction data, configuration data, control data, system data, etc. For example, the master data may mean data, that is, a basis for the generation of the corresponding data. The transaction data may mean data that is continuously generated depending on a time, an organization, etc. The object may be classified for each type which is variously defined depending on the type of data of a table included in the object.

Furthermore, the data archiving system 310 may classify an object for each characteristic. The characteristic of an object may include a document that means an order/slip that is continuously generated, a status in which a current production state of a product is recorded, a history in which a change in a document, etc. is stored, a summary in which a total amount of transactions of a customer for a given period is recorded, for example.

Figure 21:
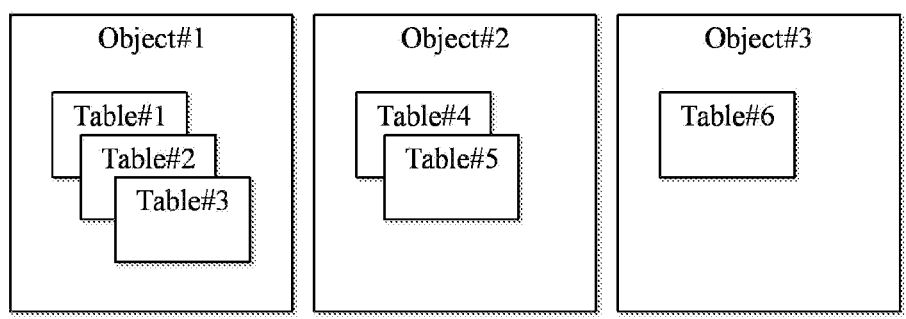
FIG. 21 is a diagram illustrating an example of objects according to an embodiment of the present disclosure.

FIG. 21 is a diagram illustrating an example of objects according to an embodiment of the present disclosure. Furthermore, FIGS. 22 and 23 are diagrams illustrating examples in which objects are classified according to an embodiment of the present disclosure.

FIG. 21 illustrates an object 1 Object #1 including a table 1 Table #1, a table 2 Table #2 and a table 3 Table #3, an object 2 Object #2 including a table 4 Table #4 and a table 5 Table #5, and an object 3 Object #3 including a table 6 Table #6. In this case, it may be seen that the table 1 Table #1, the table 2 Table #2 and the table 3 Table #3 have dependency and the table 4 Table #4 and the table 5 Table #5 have dependency.

Figure 22:
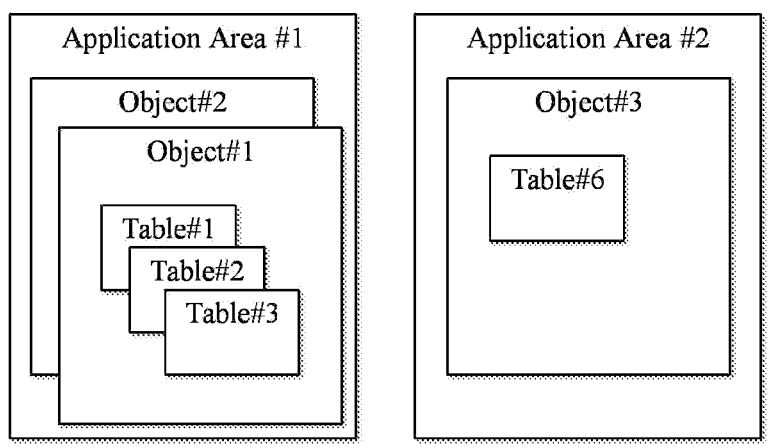
FIGS. 22 and 23 are diagrams illustrating examples in which objects are classified according to an embodiment of the present disclosure.

FIG. 22 illustrates an example in which an object 1 Object #1 and an object 2 Object #2 are divided as an application area 1 Application Area #1 and an object 3 Object #3 is classified as an application area 2 Application Area #2. As already described, the application area may correspond to a module.

Figure 23:
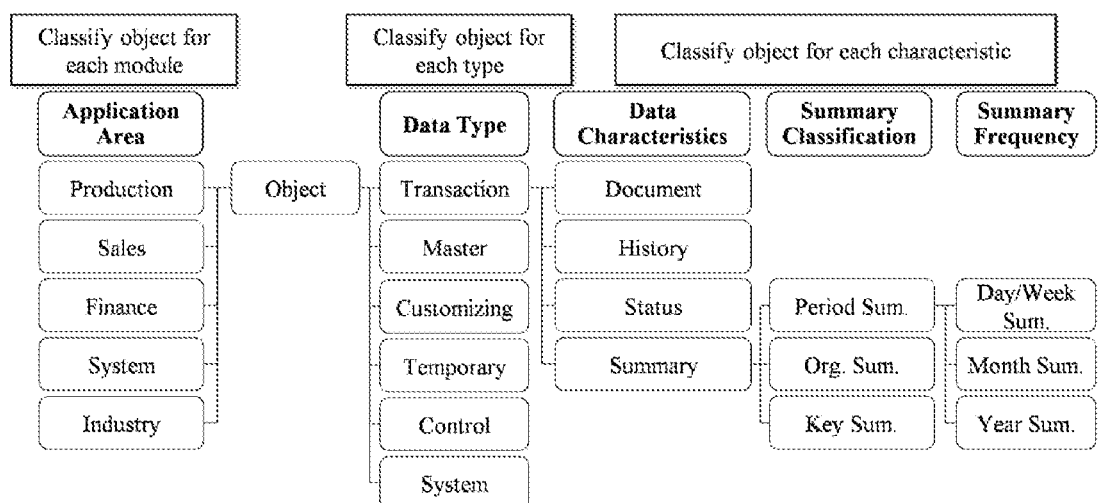

FIG. 23 illustrates an example of a process of classifying an object for each module, type and characteristic. As described above, an application area may be variously defined as production, sales, materials, financial accounting, management accounting, infrastructure, telecommunications, the industry, etc. The embodiment of FIG. 23 illustrates that an object may be classified as one of application areas of production, sales, finance, system and industry. Furthermore, it has been described that the type for classifying an object may include master data, transaction data, configuration data, control data, system data, etc. The embodiment of FIG. 23 illustrates that an object may be classified as one of a transaction data type, a master data type, a customizing data type, a temporary data type, a control data type and a system data type. Furthermore, an order/slip that is continuously generated, a status in which a current production state of a product is recorded, a history in which a change in a document, etc. is stored, a summary in which a total amount of transactions of a customer for a given period is recorded have been described as the aforementioned characteristic of an object. The characteristic of an object has also been incorporated into the embodiment of FIG. 23. Furthermore, the embodiment of FIG. 23 illustrates that an object may be sub-classified into a period summary (Period Sum.), an organization summary (Org.Sum.) and a key summary (Key Sum.) as summary classifications and may be sub-classified into a day/week summary (Day/Week Sum.), a month summary (Month Sum.) and a year summary (Year Sum.) as summary frequency of the period summary (Period Sum.). As described above, the classification of an object may be variously performed depending on a configuration of a company that maintains and manages a corresponding database.

Figure 24:
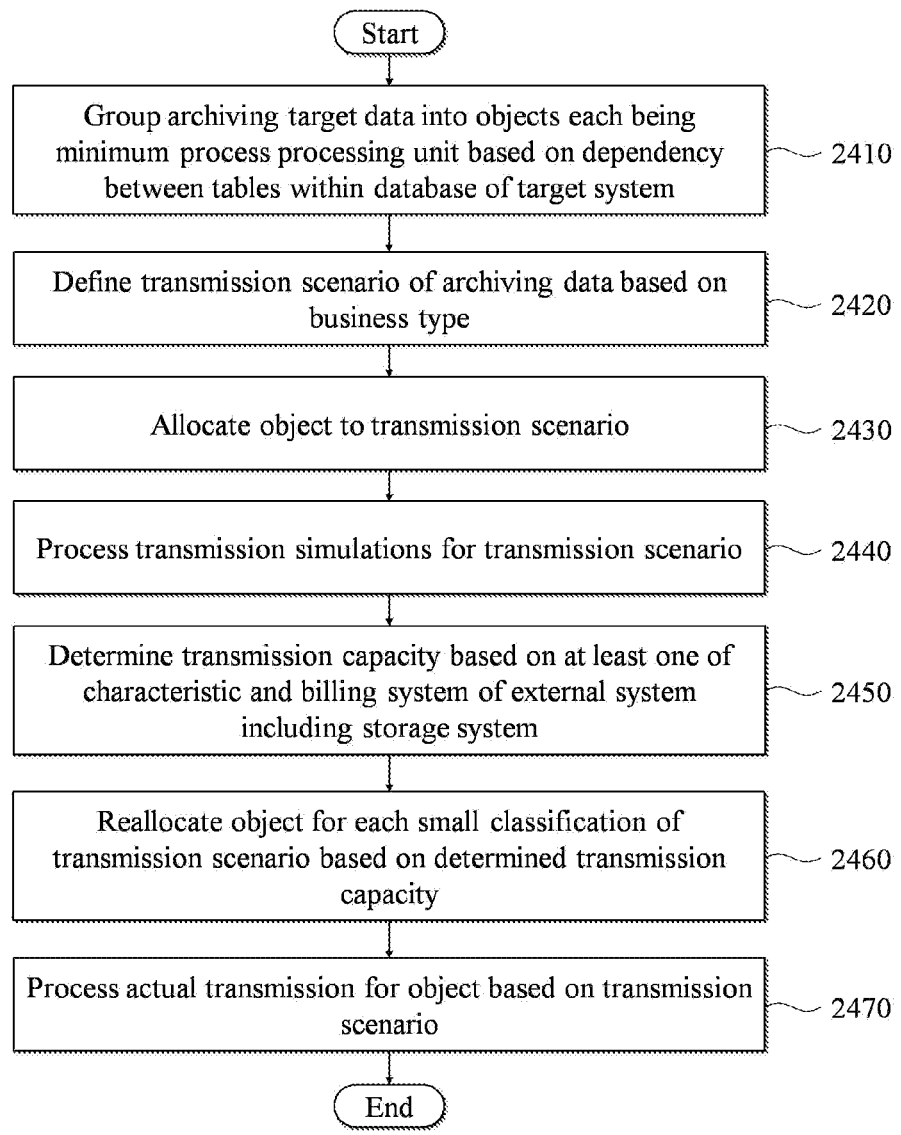
FIG. 24 is a diagram illustrating still another example of a data archiving method according to an embodiment of the present disclosure.

FIG. 24 is a diagram illustrating still another example of a data archiving method according to an embodiment of the present disclosure. The data archiving method according to the present embodiment may be performed by the computer device 200 that implements the aforementioned data archiving system 310. In this case, the processor 220 of the computer device 200 may be implemented to execute a control instruction according to a code of an operating system or a code of at least one computer program included in the memory 210. In this case, the processor 220 may control the computer device 200 so that the computer device 200 performs steps 2410 to 2470 included in the method of FIG. 24 in response to a control instruction provided by a code stored in the computer device 200. Furthermore, the computer program may correspond to the aforementioned archiving solution program.

In step 2410, the computer device 200 may group archiving target data into objects each being a minimum process processing unit based on dependency between tables within the database 321 of the target system 320. The object has already been described in detail with reference to FIGS. 21 to 23.

In step 2420, the computer device 200 may define a transmission scenario of the archiving data based on a business type. For example, the business type may include finance, costs, sales, purchase, personal information, production, sales, materials, quality, a system, etc. Furthermore, the computer device 200 may define the transmission scenario by dividing the transmission scenario into a plurality of small groups by taking a network bandwidth into consideration. The archiving data may have a capacity that is too large to be fully transmitted at once through one transmission scenario. Accordingly, if a network bandwidth is small, the computer device 200 may divide and transmit archiving data by dividing the transmission scenario into a plurality of small groups. In this case, the transmission scenario may be divided the smaller the network bandwidth, the greater the number of small groups.

In step 2430, the computer device 200 may allocate an object to the transmission scenario. If the transmission scenario is divided and defined as a plurality of small groups, the computer device 200 may divide an object into a plurality of small groups and allocate the objects. For example, a small group to which an object has been assigned may be determined by taking into consideration at least one of a module, type and characteristic of the object.

In step 2440, the computer device 200 may process transmission simulations for the transmission scenario. If the transmission scenario has been divided and defined as a plurality of small groups, the computer device 200 may process transmission simulations for each small group of the transmission scenario. For example, the computer device 200 may check a transmission time for each object through the transmission simulations, and may predict an optimal time for subsequent actual transmission for each object.

In step 2450, the computer device 200 may determine a transmission capacity based on at least one of a characteristic and billing system of an external system including the storage system 300. For example, the computer device 200 may determine a transmission capacity of data based on a system characteristic and billing characteristic of an actual transmission and reception side (an external system including the storage system 330) in a process of transmitting at least some of data stored in the target system 320 in order to archive the at least some data in the storage system 330, preferably, in the process of processing the transmission simulations in step 2430. For example, if an external system is a cloud system and uses a platform as a service (PaaS) function (an API gateway or a simple queue service (SQS), etc,) of a cloud, costs can be reduced by transmitting data based on the maximum processing availability of a corresponding function. To this end, the computer device 200 may determine the transmission capacity based on the maximum processing availability of a platform as a service (PaaS) function that is provided by a cloud system as the characteristic of the external system including an storage system. Furthermore, for example, the computer device 200 may determine the number of times of transmission or a one-time transmission capacity based on a billing system of the external system including a storage system so that a billing cost is minimized. As a more detailed example, if billing is performed based on the number of times of transmission to an actual transmission and reception side, a billing cost can be reduced by minimizing the number of times of transmission.

Meanwhile, likewise, even in a process of inquiring about data archived in the storage system 330, an inquiry capacity may be determined based on at least one of a characteristic and billing system of an external system including the storage system 330. For example, the computer device 200 may determine an inquiry capacity based on a maximum processing availability of a platform as a service (PaaS) function provided by a cloud system, or may determine the number of times of reception or a one-time reception capacity based on a billing system of an external system including a storage system so that a billing cost is minimized.

In step 2460, the computer device 200 may reallocate an object for each small classification of the transmission scenario based on the determined transmission capacity. In other words, in the process of processing the transmission simulations, if the results of simulations for costs are derived as in step 2450, the computer device 200 may reallocate an object to the transmission scenario so that the cost is minimized.

In step 2470, the computer device 200 may process actual transmission for the object based on the transmission scenario. In this case, the computer device 200 may optimize a total end time by taking into consideration an optimized prediction time for each object for transmission based on the results of the transmission simulations processed in step 2430. For example, a transmission sequence of objects may be arranged so that a small group/object having the shortest transmission time can be transmitted on the basis of a small group/object having the longest transmission time. In this case, the computer device 200 may divide data storage locations for each data character, and may control data to be stored in the storage system 330, and may check the number of transmission and an execution time in real time through a transmission situation monitoring tool. Furthermore, the computer device 200 may update a transmission execution map with an extraction progress situation, and can maintain the speed and integrity by proceeding to an order after completion when an error occurs. The transmission of data may be selectively performed through a streaming method or object unit transmission. Furthermore, the computer device 200 may confirm whether the transmission of data from the target system 320 to the storage system 330 for each scenario and/or for each small group data has been completed, and may verify a process of transmitting archiving data by comparing the transmitted data with an object capacity and quantity situation table for each transmission scenario and/or for each small group. In this case, the transmission of data may be transmitted as a 1:1 relation, and may be simultaneously transmitted to different servers having a 1:N relation. In this case, a present transmission history table may be constructed for each server.

Figure 25:
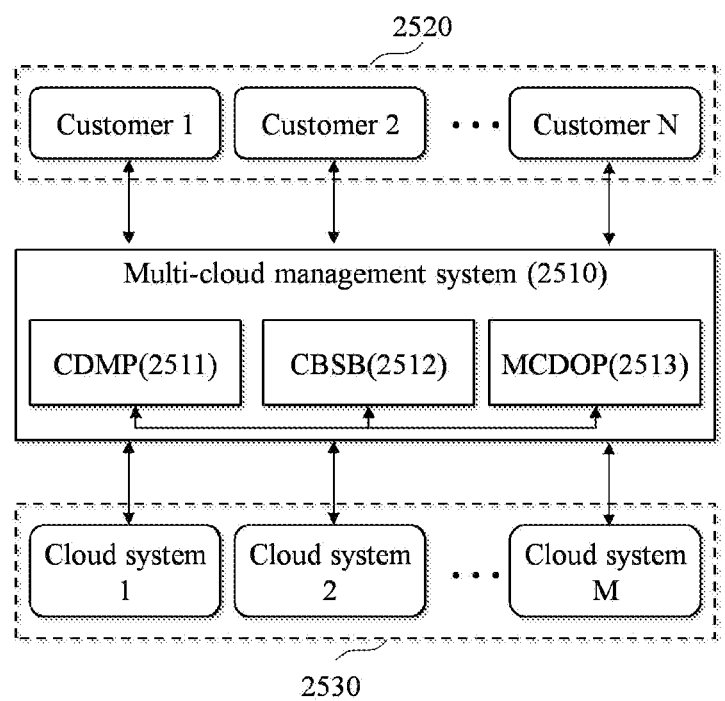
FIG. 25 is a diagram illustrating an example of a multi-cloud management system according to an embodiment of the present disclosure.

FIG. 25 is a diagram illustrating an example of a multi-cloud management system according to an embodiment of the present disclosure. FIG. 25 illustrates a multi-cloud management system 2510, a plurality of customers 2520 and a plurality of cloud systems 2530.

The plurality of customers 2520 may correspond to systems of different customers. Each of the system may correspond to the target system 320.

Furthermore, the plurality of cloud systems 2530 may correspond to systems of different cloud service providers.

The multi-cloud management system 2510 does not simply provide different customers with an archiving service by using different cloud systems, but may converge services provided by the plurality of cloud systems 2530 and provide the services to the same customer. For example, the multi-cloud management system 2510 may simultaneously use infrastructure-as-a-service (IaaS) platforms of two or more different cloud systems or simultaneously use an IaaS platform of one cloud system and a software-as-a-service (SaaS) platform of another cloud system. The cloud service provided by the plurality of cloud systems 2530 may have each advantage. As a more detailed example, Azure of Amazon has an advantage in that it provides an UI/UX having an easy configuration. Google Cloud Platform (GCP) of Google has an advantage in that it provides global network infrastructure specified for machine learning. The multi-cloud management system 2510 may plan a service by collecting advantages of cloud services suitably for requirements of a company.

As illustrated in FIG. 25, the multi-cloud management system 2510 may include a cloud data management platform (CDMP) 2511, a cloud data service broker (CDSB) 2512 and a multi-cloud data orchestration platform (MCDOP) 2513.

The CDMP 2511 may provide a service for monitoring a data usage situation and cost in each of the plurality of cloud systems 2530.

The CDSB 2512 may provide a simulation service by taking into consideration data storage, CPU efficiency, memory optimization, or network speed optimization between the plurality of cloud systems 2530.

The MCDOP 2513 may provide a service which manages data transmission between the plurality of cloud systems 2530. Furthermore, after data transmission from one cloud system to another cloud system, the MCDOP 2513 may provide a service which cleans previous data of a cloud system. In addition, the MCDOP 2513 may provide a service capable of confirming an available area of a cloud system by taking into consideration a data transmission policy of a specific country.

A company that wants to depend on a specific service or to be hindered from using an advantage of a cloud is not present. Accordingly, the utilization of such a multi-cloud may help to use all new technologies of various commercial cloud companies and to produce a more flexible and smooth service/application. For example, Amazon Web Service (AWS) may be selected as cloud infrastructure having a common purpose, and simultaneously Office 365 may be used as public and private clouds suitable several types of business. The utilization of such a multi-cloud enables the easy and fast restoration of disaster by changing processing into another vendor, thus being capable of providing the ability to easily prepare for an obstacle of a cloud server which executes a main service.

Figure 26:
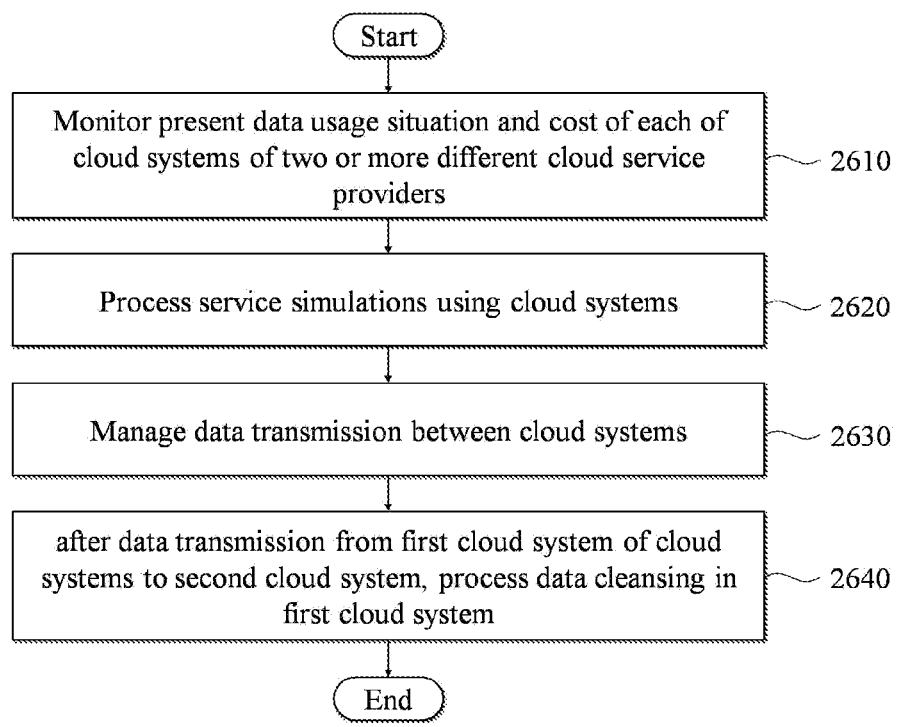
FIG. 26 is a flowchart illustrating an example of a data archiving method using a multi-cloud in an embodiment of the present disclosure.

FIG. 26 is a flowchart illustrating an example of a data archiving method using a multi-cloud in an embodiment of the present disclosure. The data archiving method according to the present embodiment may be performed by the computer device 200 that implements the aforementioned data archiving system 310. In this case, the data archiving system 310 may include the multi-cloud management system 2510 described with reference to FIG. 25. In this case, the processor 220 of the computer device 200 may be implemented to execute a control instruction according to a code of an operating system or a code of at least one computer program included in the memory 210. In this case, the processor 220 may control the computer device 200 so that the computer device 200 performs steps 2610 to 2640 included in the method of FIG. 26 in response to a control instruction provided by a code stored in the computer device 200. Furthermore, the computer program may correspond to the aforementioned archiving solution program.

In step 2610, the computer device 200 may monitor a present data usage situation and cost of each of cloud systems of two or more different cloud service providers. Data archived from one target system 320 may be stored in two or more cloud systems. The computer device 200 may monitor the present data usage situation in each of the two or more cloud systems and information on costs occurring due to the present data usage situation, and may provide the information to an administrator (e.g., a customer) of the target system 320.

In step 2620, the computer device 200 may process service simulations using the cloud systems. In this case, data storage, CPU efficiency, memory optimization, network speed optimization, etc. between the cloud systems may be taken into consideration for the service simulations. For example, the service simulations may include a simulation for virtually processing data archiving according to the needs of a customer as a combination of infra, software, etc. which are provided by the cloud systems. Accordingly, which combination of services from what cloud systems is suitable for the needs of a customer can be derived.

In step 2630, the computer device 200 may manage data transmission between the cloud systems. It is necessary to transmit data of a customer between two or more cloud systems if necessary. For example, if it is determined to be advantageous from a viewpoint of costs when archiving data of a customer stored in a first cloud system is transferred to a second cloud system, the archiving data of the customer may be transmitted from the first cloud system to the second cloud system. The computer device 200 may manage such data transmission between the cloud systems. For example, after archiving data of a customer stored in a first cloud system is received and stored by the computer device 200, the stored archiving data may be transmitted to a second cloud system.

In step 2640, after the data transmission from a first cloud system of the cloud systems to a second cloud system, the computer device 200 may process data cleansing in the first cloud system. After archiving data of a customer is transferred from the first cloud system to the second cloud system, the archiving data of the customer may be left in the first cloud system. The computer device 200 may process the cleansing of the archiving data of the customer which is left in the first cloud system.

As described above, according to embodiments of the present disclosure, costs for the transmission or inquiry of archived data can be reduced by determining a transmission capacity or an inquiry capacity based on at least one of a characteristic and billing system of a storage system in a process of transmitting, to the storage system, at least some of data stored in a target system in order to archive the at least some data in the storage system or a process of inquiring about data archived in the storage system.

The aforementioned system or device may be implemented as a hardware component or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A data archiving method performed by a computer device comprising at least one processor, comprising:
grouping, by the at least one processor, selected data for archiving among data stored in a target system in order to archive the selected data in a storage system of an external system as an object including a table or a plurality of tables having dependency on one another within a database of the target system;
dividing, by the at least one processor, a transmission of the selected data for archiving into parts depending on a network bandwidth for data transmission and a business type associated with the object, the number of the parts being increased as the network bandwidth becomes smaller;
allocating, by the at least one processor, the object to the parts of the transmission; and
processing, by the at least one processor, transmission simulations to check transmission time for the object for each of the parts of the transmission,
wherein the processing comprises:
determining, by the at least one processor, a transmission capacity to minimize a billing cost associated with the archiving of the selected data by transmitting the object based on at least one of a characteristic and billing system of the external system, the number of times of transmission or a one-time transmission capacity to minimize the billing cost being determined based on the billing system of the external system;
re-allocating the object to the parts of the transmission based on the determined transmission capacity; and
predicting an optimal transmission time for the object by arranging the parts in accordance with a transmission sequence of the parts based on the transmission time associated with each of the parts,
wherein the method further comprises
performing, by the at least one processor, actual transmissions of the object to the storage system based on results of the transmission simulations; and
providing, by the at least one processor, the number of times of the actual transmissions for the object and an execution time for the actual transmissions in real time through a transmission situation monitoring tool.

2. A computer device comprising:
at least one processor implemented to execute computer-readable instructions,
wherein the at least one processor is configured to:
group selected data for archiving among data stored in a target system in order to archive the selected data in a storage system of an external system as an object including a table or a plurality of tables having dependency on one another within a database of the target system,
divides a transmission of the selected data for archiving into parts depending on a network bandwidth for data transmission and a business type associated with the object, the number of the parts being increased as the network bandwidth becomes smaller,
allocates the object to the parts of the transmission, and
processes transmission simulations to check transmission time for the object for each of the parts of the transmission,
wherein the at least one processor is configured to, during the processing of the transmission simulations,
determine a transmission capacity to minimize a billing cost associated with the archiving of the selected data by transmitting the object based on at least one of a characteristic and billing system of the external system, the number of times of transmission or a one-time transmission capacity to minimize the billing cost being determined based on the billing system of the external system,
re-allocate the object to the parts of the transmission based on the determined transmission capacity, and
predict an optimal transmission time for the object by arranging the parts in accordance with a transmission sequence of the parts based on the transmission time associated with each of the parts,
wherein the at least one processor is further configured to perform actual transmissions of the object to the storage system based on results of the transmission simulations, and provide the number of times of the actual transmissions for the object and an execution time for the actual transmissions in real time through a transmission situation monitoring tool.

\* \* \* \* \*